US005919552A

United States Patent [19]
Malhotra

[11] Patent Number: 5,919,552

[45] Date of Patent: Jul. 6, 1999

[54] COATED SUBSTRATES AND METHODS

[75] Inventor: Shadi L. Malhotra, Mississauga, Canada

[73] Assignee: Xerox Corporation, Stamford, Conn.

[21] Appl. No.: 08/852,553

[22] Filed: May 7, 1997

[51] Int. Cl.$^6$ .................................................. B32B 3/00

[52] U.S. Cl. ........................... 428/195; 428/76; 428/174; 430/124; 430/47; 430/97

[58] Field of Search ............................... 430/47, 97, 101, 430/120, 124; 399/226; 156/64; 358/296; 428/195, 42.1, 76, 174

[56] References Cited

U.S. PATENT DOCUMENTS

| | | | |
|---|---|---|---|
| 5,314,747 | 5/1994 | Malhotra et al. | 428/341 |
| 5,320,902 | 6/1994 | Malhotra et al. | 428/342 |
| 5,413,840 | 5/1995 | Mizuno | 428/195 |
| 5,418,208 | 5/1995 | Takeda et al. | 503/227 |
| 5,422,175 | 6/1995 | Ito et al. | 428/304.4 |
| 5,612,777 | 3/1997 | Malhotra | 399/226 |
| 5,846,637 | 12/1998 | Malhotra | 428/195 |

*Primary Examiner*—William Krynski
*Assistant Examiner*—Hong J. Xu
*Attorney, Agent, or Firm*—E. O. Palazzo

[57] ABSTRACT

A coated paper and a method for creating gloss on an image, by (A) providing a substrate having a right reading toner image formed thereon using a nonphotographic imaging process; (B) providing a backing substrate having one surface thereof coated with four coatings in a layered structure where (1) a first coating in contact with the substrate is a release composition comprised of a release polymer and a monomeric release molecule, (2) a second coating on the top of the release coating is a scuff resistant, lightfast, waterfast transparent polymeric coating comprised of a hydrophobic binder, a lightfastness inducing agent, an antistatic agent, a flavor imparting material, and a filler, (3) a third adhesive coating on the top of the second coating comprising a polymeric adhesive binder having a glass transition temperature of between −50° C. to about 55° C., an antistatic agent, a lightfastness composition, (4) a fourth toner wetting coating on the top of the third adhesive coating comprising a hydrophilic polymer having a melting point of from about 50° C. to about 100° C.; and (C) laminating the imaged substrate to the backing substrate with heat at about 120° C. to about 180° C. and a pressure of about 25 to about 200 psi, and transferring the scuff resistant coating from the release substrate on to the image to generate glossy images.

20 Claims, No Drawings

COATED SUBSTRATES AND METHODS

PENDING APPLICATIONS

Illustrated in copending applications U.S. Ser. No. 08/852,550; U.S. Ser. No. 08/852,776; U.S. Pat. No. 5,846,637, and U.S. Pat. No. 5,746,814; the disclosures of which are totally incorporated herein by reference, are recording sheets, coated ink jet papers, coated xerographic photographic papers, and decurling compositions, respectively.

BACKGROUND OF THE INVENTION

The present invention is directed to coated substrates, and methods thereof, and for example, a method of generating gloss on an image obtained from xerographic processes, ink jet printing processes, and the like. More specifically, the present invention is directed to a method of generating gloss on an image wherein hydrophobic, abrasion resistant, polymeric transparent coatings are transferred on to the image by heat and pressure from a coated release substrate.

PRIOR ART

In conventional xerography there are formed electrostatic latent images on a xerographic surface by first uniformly charging a charge retentive surface such as a photoreceptor. The charged area is selectively dissipated in accordance with a pattern of activating radiation corresponding to original images. The selective dissipation of the charge provides a latent charge pattern on the imaging surface corresponding to the areas not exposed by radiation. This charge pattern is rendered visible by developing it with toner by passing the photoreceptor past one or more developer housings. In monochromatic imaging, the toner generally comprises black thermoplastic powder particles which adhere to the charge pattern by electrostatic attraction. The developed image is then fixed to the imaging surface or is transferred to a receiving substrate such as plain paper to which it is fixed by suitable fusing techniques.

Recently, efforts have been directed to the development of color copiers/printers which utilize the xerographic and/or ink jet imaging process, reference for example, the Xerox Corporation 4900™, Xerox 5760™, Xerox 5770™, Xerox 5775™ copier/printers.

Not withstanding all the recent development in the area of color printers and copiers, there appears to be a need for improvements in the quality of color images formed on paper and synthetic substrates, such as MYLAR® and TESLIN®, especially with regard to attempting to create high gloss photographic-quality images using nonphotographic processes like xerography.

Attempts at further improving conventionally formed color toner images have led to the lamination of xerographic images on paper using a transparent substrate. With this process, the lamination tends to reduce the density range of the print resulting in a print that has less shadow detail. The lamination process can also add significant weight, thickness and curl to the final print. Additionally, it is believed that the aforementioned lamination process will not generate acceptable desired gloss primarily since the color toner images at the interface between the laminate and the toner do not make suitable optical contact, that is the initially irregular toner image at the interface is still irregular (contains voids) after lamination that light is reflected from at least some of those surfaces and is precluded from passing through the toner. With these voids between the transparency and toner image, light is scattered and reflected back without passing through the colored toner. Loss of image contrast results when any white light is scattered, either from the top surface of the transparent substrate or from the irregular toner surfaces and doesn't pass through the toner.

A known method of improving the appearance of color xerographic images on a substrate comprises refusing the color images on paper. However, the gloss is image-dependent. Thus, the gloss can be high in areas of high toner density because the toner refuses in contact with the clear plastic sheet and becomes very smooth. In areas where there is little or no toner, the gloss is similar to the gloss of the substrate.

U.S. Pat. No. 5,612,777 discloses a method and apparatus for creating color toner images, said apparatus comprising (1) means for forming color toner images on an image receiver; (2) means for depositing a hydrophobic material composition comprising a scratch resistant polymer material and a lightfastness material comprising a UV absorber and an antioxidant; and (3) means for fusing said color toner images and said hydrophobic material to a substrate.

U.S. Pat. No. 5,418,208 discloses a laminated plastic card providing a lamination of a dye accepting layer, a substrate of paper or the like, and a back coat layer on which lamination one or more patterns are printed with a volatile dye, and a transparent plastic film adhered on the lamination by an adhesive agent, wherein the adhesive agent is a saturated polyester having an average molecular weight of 18,000 gm/mole and produced by condensation polymerization of polypropylene glycol or trimethylol propane and adipic acid or azelaic acid.

U.S. Pat. No. 5,413,840 discloses a decorative laminated sheet having a sense of being coated and having improved surface hardness, which is produced by laminating a polyester film excellent in transparency on the surface of a semi-rigid thermoplastic resin film supplied with a colored layer or a pattern-printed layer, and then coating a hard coat layer comprising a UV-curable coating on the surface of the polyester film of the resulting laminated film, and a process for producing the same.

There is a continuing need for improved gloss imparting coatings which can be laminated by the application of heat and pressure to the toned images obtained from electrophotographic imaging processes and ink jet printing processes. Also, it would be desirable to handwrite messages on the glossy side of the coating when used for creating simulated photographic-quality prints.

BRIEF SUMMARY OF THE INVENTION

The present invention is directed to creating gloss on a printed image. Specifically, the present invention is directed to processes for creating gloss on prints using hydrophobic, abrasion resistant, self supporting, polymeric transparent coatings. The process comprises a method for creating gloss on an image comprising (1) providing a coated image receiving substrate having a toner image formed thereon; and (2) providing a backing substrate having one surface thereof coated with four coatings in a layered structure containing (a) a first coating in contact with the backing substrate comprised of a release composition comprised of a release polymer and a monomeric release compound, (b) a second coating on the top of the release coating and which coating is, for example, scuff resistant, about 100 percent waterfast and about 100 percent lightfast, and which coating is comprised of a transparent polymeric coating comprised of a hydrophobic binder, a lightfastness agent, (agent or compound throughout) an antistatic agent, a flavor imparting agent, and a filler, (c) a third adhesive coating on the top of the second coating comprising a polymeric adhesive binder with a glass transition temperature of between about −50° C. to about 55° C. (Centigrade throughout) and preferably from about −40° C. to about 40° C., an optional antistatic agent, an optional lightfastness inducing composition and an optional filler; (d) a fourth toner wetting coating on the top of the third adhesive coating comprising a hydrophilic polymer with a melting point of about 50° C. to about 100° C.; laminating the imaged substrate to the backing substrate with heat and pressure, and transferring the scuff resistant coating from the release substrate on to the image to thereby generate glossy images.

DETAILED DESCRIPTION OF THE PREFERRED EMBODIMENTS OF THE INVENTION

Embodiments of the present invention include a coated component comprised of a substrate and thereover in sequence a coating of (1) a polymer and monomer release compound, (2) a hydrophobic binder, a luminescence imparting agent, a lightfastness agent, an antistatic agent, a flavor imparting agent, and a filler, (3) a polymeric adhesive binder with a glass transition temperature of between about −50° C. to about 55° C., an antistatic agent, and a lightfastness agent, and (4) a toner wetting layer comprised of a hydrophilic polymer with a melting point of from about 50° C. to about 100° C.; and wherein the substrate contains thereover in sequence layers of (1), (2), (3), and (4) with (1) in contact with the substrate, (2) in contact with (1) and coated thereon (3) in contact with (2) and coated thereon, and (4) in contact with (3) and coated thereon.

Illustrative examples of imaging substrates include commercially available internally and externally (surface) sized papers such as Diazo papers, offset papers such as Great Lakes offset, recycled papers, such as Conservatree, office papers, such as Automimeo, Eddy liquid toner paper and copy papers available from companies such as Nekoosa, Champion, Wiggins Teape, Kymmene, Modo, Domtar, Veitsiluoto, Sanyo, and coated base papers available from companies such as Schoeller Technical Papers, Inc., and the like.

Examples of plastic backing substrates include polyesters, including MYLAR®, polyethylene terephthalate available from E.I. DuPont de Nemours & Company, MELINEX®, polyethylene terephthalate available from Imperial Chemicals, Inc., CELANAR®, polyethylene terephthalate available from Celanese Corporation, polyethylene naphthalates, such as Kaladex PEN films, available from Imperial Chemical Industries, polycarbonates, such as LEXAN®, available from General Electric Company, polysulfones, such as those available from Union Carbide Corporation, polyether sulfones, UDEL®, available from Union Carbide Corporation, polyether sulfones, VICTREX®, available from ICI Americas Incorporated, poly(arylene sulfones), cellulose triacetate, polyvinylchloride, cellophane, polyvinyl fluoride, polyimides, and the like, with polyester, such as MYLAR®, being preferred primarily because of its availability and relatively low cost. The substrate can also be opaque, including opaque MYLARS, which are barium sulfate and titanium dioxide filled polyethylene terephthalate, as well as void-containing polyesters of U.S. Pat. No. 5,422,175, opaque polyolefins, such as TESLIN®, which is filled polypropylene with microvoids available from PPG Industries.

The substrates can be of any effective thickness. Typical thicknesses for the substrate are from about 50 to about 500 microns, and preferably from about 100 to about 125 microns, although the thickness may be outside these ranges.

The imaging substrate and the backing substrate may each be provided with one or more coatings for producing enhanced simulated color photographic-quality prints using nonphotographic imaging processes such as xerography.

The first release coating in contact with one surface of the backing substrate is present on one surface of the backing substrate of the present invention in any effective thickness. Typically, the total thickness of the first coating layer is from about 0.1 to about 25 microns and preferably from about 0.5 to 10 microns, although the thickness can be outside of these ranges.

The first release coating applied to one side of the backing substrate is comprised of a monomeric silicone material, or compound such as 1,7-dichloro octamethyl tetra siloxane, phenyl-2-(trimethylsilyl)methylsulfone, (9,10-dihydro-9-anthracenyl)trimethyl silane, and the like. The release silicone based polymeric binder, such as α-methyl styrene-dimethylsiloxane block copolymer, dimethylsiloxane-bisphenol A carbonate block copolymer, and the like, is present in amounts of from about 10 parts by weight to about 90 parts by weight and preferably from about 30 parts by weight to about 70 parts by weight although the amounts can be outside of this range. The monomeric silicone material is present in amounts of from about 90 parts by weight to about 10 parts by weight and preferably from about 70 parts by weight to about 30 parts by weight, although the amounts can be outside of this range.

The second abrasion resistant coating (B) in contact with the first release coating composition is present on one surface of the backing substrate of the present invention in any effective thickness. Typically, the total thickness of the second coating layer is from about 0.1 to about 25 microns and preferably from about 0.5 to 10 microns, although the thickness can be outside of these ranges.

Specifically, the second abrasion resistant, luminescent, flavored layer present on the top of the first release layer of the backing substrate is, for example, comprised of a binder present in an amount of from about 97.5 parts by weight to about 20 parts by weight, a luminescence imparting compound present in an amount of from about 0.5 part by weight to about 20 parts by weight, a flavor imparting compound present in an amount of from about 0.5 part by weight to about 10 parts by weight, an antistatic agent present in an amount of from about 0.5 part by weight to about 20 parts by weight, a lightfastness inducing compound present in amount of from about 0.5 part by weight to about 20 parts by weight, and a filler present in an amount of from about 0.5 part by weight to about 10 parts by weight. Based on 100 parts, the six ingredients such as (1) binder, (2) luminescence imparting compound, (3) flavor imparting compound, (4) antistatic agent, (5) a lightfastness composition, and (6) filler of the abrasion resistant second coating have the following composition range of from [97.5+0.5+0.5+0.5+0.5+0.5=100] to [20+20+10+20+20+10=100].

The second (2) abrasion, scuff resistant protective coating, which is applied to the first release coating of the backing substrate, includes (1) a material which is a hydrophobic, abrasion resistant polymeric binder such as a polycarbonate, polyamide and the like, (2) a luminescence producing compound such as R-105-817 pink pigment, R-103-G-118 magenta pigment, (3) a flavor imparting compound such as strawberry flavor producing ethyl maltol, methyl cinnamate, 4-hydroxy-2,5-dimethyl-3(2H)-furanone, ethylmethylphenylglycidate, rose flavor imparting compound, such as β-damascenone, musk flavor imparting compound, such as muscone, (4) an antistatic agent such as quaternary ammonium salts, such as polymethyl acrylate trimethyl ammonium chloride latex, 2-methyl-3-propyl benzothiazolium iodide, (5) a lightfastness inducing agent, such as a UV absorbing compound, such as 2-hydroxy-4-(octyloxy) benzophenone, 2-(4-benzoyl-3-hydroxy phenoxy)ethyl acrylate, and the like, antioxidant compounds, such as didodecyl-3,3'-thiodipropionate, ditridecyl-3,3'-thiodipropionate, ditetradecyl-3,3'-thiodipropionate, 2,2'-ethylidene-bis(4,6-di-tert-butylphenyl)fluoro phosphonite, and the like, antiozonant compounds, such as N-isopropyl-N'-phenyl-phenylene diamine, N-(1,3-dimethylbutyl)-N'-phenyl-phenylene diamine, N,N'-di(2-octyl)-4-phenylene diamine, N,N'-bis(1,4-dimethyl pentyl)-4-phenylene diamine, mixtures thereof; and the like, and (6) a filler such as zirconium oxide, colloidal silicas, and the like.

The third (3) adhesive coating in contact with the second abrasion resistant protective glossy coating composition is present on one surface of the backing substrate of the present invention in any effective thickness. Typically, the total thickness of the third adhesive coating layer is from about 0.1 to about 25 microns and preferably from about 0.5 to about 10 microns, although the thickness can be outside of these ranges.

Examples of third (3) adhesive coatings applied to the second abrasion resistant protective glossy coating comprise (1) a polymeric adhesive binder having a glass transition temperature of from about −50° C. to about 55° C. and preferably from about −40° C. to about 40° C., such as acrylic emulsion latex, Rhoplex B-15J, poly(2-ethylhexyl methacrylate), present in amounts of from about 99 parts by weight to about 60 parts by weight, (2) antistatic agent, such as cationic 2-methyl-3-propyl benzothiazolium iodide, anionic sodium dioctyl sulfosuccinate, present in amounts of from about 0.5 part by weight to about 20 parts by weight, (3) lightfastness agents, such as UV absorbing compound poly[2-(4-benzoyl-3-hydroxyphenoxy) ethylacrylate], poly[N,N-bis(2,2,6,6-tetramethyl-4-piperidinyl)-1,6-hexanediamine-co-2,4-dichloro-6-morpholino-1,3,5-triazine], antioxidant compounds such as didodecyl-3,3'-thiodipropionate, ditridecyl-3,3'-thiodipropionate, ditetradecyl-3,3'-thiodipropionate, and antiozonant compounds, such as 6-ethoxy-1,2-dihydro-2,2,4-trimethyl quinoline, N-(1,3-dimethylbutyl)-N'-phenyl-phenylene diamine present in amounts of from about 0.5 part by weight to about 20 parts by weight. Based on 100 parts, the three ingredients, such as (1) binder, (2) antistatic agent, and (3) the lightfastness agent, the third coating has the following composition range from [99+0.5+0.5=100] to [60+20+20=100].

The third adhesive coating applied to the second abrasion resistant protective glossy coating is further coated with a fourth coating (4) comprised of a polymeric material, such as poly(ethylene oxide), ethylene oxide/propylene oxide copolymers, ethylene oxide/propylene oxide/ethylene oxide triblock copolymer, having a melting point of between 50° C. to about 100° C. The purpose of the fourth coating is prevent the third coating adhesive binder from being active until it is exposed to heat and pressure. Moreover, the fourth coating can function as a wetting agent which effects spreading of the inks/toners on the substrate.

The fourth coating is present on the coated backing substrate in any effective thickness. Typically, the total thickness of the coating layer is from about 0.1 to about 25 microns and preferably from about 0.5 to 10 microns, although the thickness can be outside of these ranges.

Examples of suitable release polymers of the first coating layer composition present in amounts of from about 10 parts by weight to about 90 parts by weight and preferably from about 30 parts by weight to about 70 parts by weight include polysilanes, such as polydialkyl silanes such as polydimethyl silanes, such as #788 available from Scientific Polymer Products, polydialkyl siloxane such as polydimethylsiloxane, such as #145, #805, #806, #807, #808, #809, #810, #811, #812, #870, available from Scientific Polymer Products, polydimethylsiloxane, bis(12-hydroxy stearate) terminated, such as #43,489-2 available from Aldrich Chemicals, polydimethylsiloxane, distearate terminated, such as #43,488-4 available from Aldrich Chemicals, polydimethylsiloxane, hydroxy terminated, such as #43,297-0; 43,298-9; 43,299-7; available from Aldrich Chemicals, polydimethylsiloxane, methoxy terminated, such as #43,536-8 available from Aldrich Chemicals, polydimethylsiloxane, vinyl terminated, such as #43,300-4; #43,301-2; available from Aldrich Chemicals, poly(dimethylsiloxane-co-dimeracid), bis(perfluorododecyl) terminated, such as #43,490-6 available from Aldrich Chemicals, SYL-OFF(R ) 1171 and X2-7740 emulsions catalyzed by X2-7741, all available from Dow Corning, poly(methyl hydrosiloxane) #17,620-6, available from Aldrich Chemicals, poly(methyl phenyl siloxane) #37,849-6, available from Aldrich Chemicals, α-methylstyrene-dimethylsiloxane block copolymers, such as PS 0965 available from Petrarch Systems, dimethyl siloxane-bisphenol A carbonate block copolymers, such as PS099 available from Petrarch Systems, poly(dimethylsiloxane-co-diphenylsiloxane), such as #802 available from Scientific Polymer Products, poly(dimethyl siloxane) monocarbinol terminated (PS558, Petrarch Systems Inc.) and dicarbinol terminated (PS555, PS556, Petrarch Systems Inc.); poly(dimethyl siloxane)-b-poly(methyl siloxane alkylene oxide) copolymers (PS 073, PS 072, PS 071, Petrarch Systems Inc.), Alkasil HEP 182-280, Alkasil HEP 148-330, Alkaril Chemicals, non-hydrolyzable copolymers containing S1-C linkages; poly(dimethyl siloxane)-b-poly(propylene oxide)-b-poly(ethylene oxide) copolymers (Alkasil NEP 73-70, Alkaril Chemicals), hydrolyzable copolymer containing S1-O-C linkages; and polyquaternary poly(dimethyl siloxane) copolymers (which can be obtained by the addition reaction of αω-hydrogen polysiloxane with epoxides containing olefinic bonds and then reacting the product with a diamine).

The first layer release composition comprised of a release polymer also contains a monomeric release compound, or molecules comprised of silane units present in amounts of from about 90 parts by weight to about 10 parts by weight and preferably from about 70 parts by weight to about 30 parts by weight, such as tripropyl silane (Aldrich #27,756-8), tributyl silane (Aldrich #27,877-7), tribenzyl silane (Aldrich #24,956-4), triphenyl silane (Aldrich #14,850-4), triphenylvinyl silane (Aldrich #36,268-9), phenyltrimethyl silane (Aldrich #19,773-4), 1-(trimethylsilyl)-H-benzotriazole (Aldrich #42,509-5), phenyl-2-(trimethylsilyl) methyl sulfone (Aldrich #30,674-6), phenyl-2-(trimethylsilyl)ethyl sulfone (Aldrich #37,625-6), phenyl-2-(trimethylsilyl)ethynyl sulfone (Aldrich #29,655-4), 4-tolyl-2-(trimethylsilyl)ethynyl sulfone (Aldrich #42,334-3), (trimethylsilyl)acetic acid (Aldrich #34,161 -4), [2-(trimethylsilyl)ethoxy methyl] triphenyl phosphonium chloride (Aldrich #33,067-1), 1 -(trimethylsilyl methyl) urea (Aldrich #25,464-9), (3-trimethylsilyl-2-propynyl)triphenyl phosphonium bromide (Aldrich #29,958-8), octamethyl cyclotetra siloxane (Aldrich #23,569-5), methyl (diphenylmethyl silyl)acetate (Aldrich #30,278-3), dimethyl octadecyl silane (Aldrich #27,613-8), (9,10-dihydro-9-anthracenyl)trimethyl silane (Aldrich #40,612-0), tetrakis (trimethylsilyl) silane (Aldrich #33,143-0), (3-mercapto propyl) trimethoxy silane (Aldrich #17,561-7), 3-glycidoxy propyl trimethoxy silane (Aldrich #23,578-4), 3-amino propyl triethoxy silane (Aldrich #11,339-5), phenyl trimethoxy silane (Aldrich #10,474-4), bis[(3-trimethoxy silyl)propyl] amine (Aldrich #41,335-6), 1,2-bis(dichloromethyl silyl) ethane (Aldrich #43,821-9), 3-(triethoxy silyl)propyl thiocyanate (Aldrich #37,627-2), 4-(triethoxy silyl)butyronitrile (Aldrich #37,415-6), [3-(triethoxy silyl)propyl]trimethyl ammonium chloride (Aldrich #37,629-9), 3-(triethoxy silyl) propyl isocyanate (Aldrich #41,336-4), 3-(triethoxy silyl) propionitrile (Aldrich #12,537-7), ethyl(S)-(-)-2-(tert-butyl dimethyl silyloxy) propionate (Aldrich #42,495-1), 3-(tert-butyl dimethyl silyloxy)glutaric anhydride (Aldrich #34, 159-2), bromo dimethyl trityl silane (Aldrich #37,600-0), (3-chloropropyl)trimethoxy silane (Aldrich #25,457-6), chloromethyl trimethoxy silane (Aldrich #39,104-2), chloro tris(1,3-dimethyl butoxy)silane (Aldrich #38,938-2), chloro methyl(2-chlorophenoxy)dimethyl silane (Aldrich #40,761-5), 1,7-dichloro octamethyl tetra siloxane (Aldrich #38,437-2), dichloromethyl phenyl silane (Aldrich #10,478-7), benzyl trichlorosilane (Aldrich #37,449-0), phenyl trichloro silane (Aldrich #P3,670-3), tolyltrichloro silane (Aldrich #41,935-4), dodecyl trichloro silane (Aldrich #28,056-9), chloro tripropyl silane (Aldrich #25,445-2), chloro triisopropyl silane (Aldrich #24,172-5), chloro tributyl silane (Aldrich #28,270-7), chloro tribenzyl silane (Aldrich #24, 689-1), chlorodimethyl octadecyl silane (Aldrich #28,910-8), (trichloromethyl) trimethyl silane (Aldrich #37,628-0); and mixtures thereof.

This second abrasion resistant, luminescent, flavored layer present on the top of the first release layer is preferably comprised of a binder present in an amount of from about 95 parts by weight to about 35 parts by weight, a luminescence imparting compound present in an amount of from about 1 part by weight to about 15 parts by weight, a flavor imparting compound present in an amount of from about 1 part by weight to about 15 parts by weight, an antistatic agent present in an amount of from about 1 part by weight to about 15 parts by weight, a lightfastness inducing composition present in an amount of from about 1 part by weight to about 10 parts by weight, and a filler present in an amount of from about 1 part by weight to about 10 parts by weight. Based on 100 parts, the six ingredients, such as (1) binder, (2) luminescence imparting compound, (3) flavor imparting compound, (4) antistatic agent, (5) a lightfastness composition, and (6) filler of the abrasion resistant second coating, have the following preferred composition range from [95+1+1+1+1+1=100] to [35+15+15+15+10+10=100].

Examples of suitable polymers for use as the second coating, which is flavored, hydrophobic, abrasion resistant, anti-slip, and which can be written upon using, for example, pen or pencil as well as being receptive to xerographic imaging present in amounts of from about 97.5 parts by weight to about 20 parts by weight and preferably from about 95 parts by weight to about 35 parts by weight include derivatives and copolymers of poly(vinyl acetate) such as poly(vinyl formal), such as #012 available from Scientific Polymer Products, poly(vinyl butyral), such as #043, #511, #507, available from Scientific Polymer Products, vinyl alcohol-vinyl butyral copolymers, such as #381 available from Scientific Polymer Products, vinyl alcohol-vinyl acetate copolymers, such as #379 available from Scientific Polymer Products, vinyl chloride-vinyl acetate copolymers, such as #063, #068, #070, #422 available from Scientific Polymer Products; polyvinyl chloride copolymers such as vinyl chloride-vinyl acetate-vinyl alcohol terpolymers, such as #064, #427, #428 available from Scientific Polymer Products, vinyl chloride-vinylidene chloride copolymers, such as #058 available from Scientific Polymer Products, vinylidene chloride-acrylonitrile copolymers, such as #395, #396 available from Scientific Polymer Products; substituted cellulose esters such as cyanoethylated cellulose, such as #091 available from Scientific Polymer Products, cellulose acetate hydrogen phthalate, such as #085 available from Scientific Polymer Products, hydroxypropylmethyl cellulose phthalate, such as HPMCP available from Shin-Etsu Chemical, hydroxypropyl methyl cellulose succinate, such as HPMCS available from Shin-Etsu Chemical, cellulose triacetate, such as #031 available from Scientific Polymer Products, cellulose acetate butyrate, such as #077 available from Scientific Polymer Products, (acrylamidomethyl) cellulose acetate butyrate, such as #43,106-0 available from Aldrich Chemical Company, cellulose propionate, such as #2052 available from Scientific Polymer Products; polystyrene and derivatives thereof such as polystyrene, such as #039A, #039D, #845, #756 available from Scientific Polymer Products, poly(4-methylstyrene), such as #315, #593, #839, available from Scientific Polymer Products, poly(α-methylstyrene), such as #2055 available from Scientific Polymer Products, poly(tert-butylstyrene), such as #177 available from Scientific Polymer Products, poly(2-chlorostyrene), such as #777,available from Scientific Polymer Products, poly(3-chlorostyrene), such as #778 available from Scientific Polymer Products, poly(4-chlorostyrene), such as #257 available from Scientific Polymer Products, poly(2-bromostyrene), such as #775 available from Scientific Polymer Products, poly(3-bromostyrene), such as #776 available from Scientific Polymer Products, poly(4-bromostyrene), such as #212 available from Scientific Polymer Products, poly(4-methoxy styrene), such as #314 available from Scientific Polymer Products, poly(2,4,6-tribromostyrene), such as #166 available from Scientific Polymer Products, styrene-butylmethacrylate copolymers, such as #595 available from Scientific Polymer Products, styrene-acrylonitrile copolymers, such as #495 available from Scientific Polymer Products, styrene-allyl alcohol copolymers, such as #393, #394 available from Scientific Polymer Products; poly(vinyl pyridine) and its derivatives such as poly(2-vinyl pyridine), such as #813, #814 available from Scientific Polymer Products, poly(4-vinyl pyridine), such as #700, #840 available from Scientific Polymer Products, poly(2-vinyl pyridine-co-styrene), such as #319 available from Scientific Polymer Products, poly(4-vinyl pyridine-co-styrene), such as #416, #859 available from Scientific Polymer Products, poly(4-vinyl pyridine-co-butylmethacrylate), such as #312, #667, #858 available from Scientific Polymer Products, poly(vinyl toluene), such as #261 available from Scientific Polymer Products, poly(2-vinyl naphthalene), such as #163 available from Scientific Polymer Products; polyalkyl methacrylates, and their derivatives such as poly(methyl methacrylate), such as #037A, #037B, #037D, #307, #424, #689, available from Scientific Polymer Products, poly(ethyl methacrylate), such as #113, #308, available from Scientific Polymer Products, poly(isopropyl methacrylate), such as #476 available from Scientific Polymer Products, poly(phenyl methacrylate), such as #227 available from Scientific Polymer Products, poly(phenoxy ethyl methacrylate), such as #893 available from Scientific Polymer Products, poly(2-hydroxypropyl methacrylate), such as #232 available from Scientific Polymer Products, polyamide resin, such as #385, #386, #387, #388, #389, #390, available from Scientific Polymer Products; polysulfones and its derivatives such as poly(p-phenylene ether-sulfone), such as #392 available from Scientific Polymer Products, polysulfones, such as #046 available from Scientific Polymer Products; polycarbonate and its copolymers such as aromatic ester carbonate copolymers, such as APE KLI-9306, APE KLI-9310, available from Dow Chemical Company, polycarbonates, such as #035 available from Scientific Polymer Products; poly(2,6-dimethyl p-phenylene oxide), such as #126 available from Scientific Polymer Products.

In addition, the second coating contains flavor imparting compounds present, for example, in amounts of from about 0.5 part by weight to about 20 parts by weight and preferably from about 1 part by weight to about 15 parts by weight including apple flavor compounds such as isoamyl acetate (Aldrich #30,696-7), ethyl 2-methylbutyrate (Aldrich #30, 688-6), n-hexanal (Aldrich #11,560-6); rose flavor compounds such as damascenone (CAS #23696-85-7; CAS #23726-93-4); musk flavor compounds such as muscone (CAS #541-91-3); sandlewood flavor compounds such as eremophilone (CAS #562-23-2); anise flavor compounds such as anethole (Aldrich #11,787-0); blueberry flavor compounds such as isobutyl 2-buteneoate (CAS #589-66-2); caramel flavor compounds such as 2,5-dimethyl-4-hydroxy-3(2H)-furanone (Aldrich #32,248-2); caraway and spearmint flavor compounds such as carvone (Aldrich #12,493-1); cherry flavor compounds such as benzaldehyde (Aldrich #B,133-4), tolyl aldehyde (CAS #23696-85-7), benzyl acetate (Aldrich #B1,580-5); chocolate flavor compounds such as 5-methyl-2-phenyl-2-hexenal (CAS #21834-92-4), isoamyl butyrate (CAS #106-27-4), vanillin (Aldrich #V, 110-4), isoamyl phenylacetate (CAS #102-19-2), 2-methoxy-5-methylpyrazine (Aldrich #29,794-1); cinnamon flavor compounds such as cinnamic aldehyde (Aldrich #23,996-8); coffee flavor compounds such as furfuryl mercaptan (Aldrich #F2,040-8), furfuryl thiopropionate (CAS #59020-85-8); coconut flavor compounds such as γ-nonalactone (CAS #104-61-0); cognac flavor compounds such as ethyl oenanthate (CAS #106-30-9); fresh fruit flavor compounds such as 2-methyl-2-pentenoic acid (Aldrich #26, 477-6); grape and honey flavor compounds such as methyl anthranilate (Aldrich #23,645-4), ethyl- 3-hydroxybutyrate (Aldrich #E3,060-3); grapefruit flavor compounds such as nootkatone (CAS #4674-50-4); hazelnut flavor compounds such as methyl(methylthio)pyrazine (CAS #21948-70-9); jasmine flavor compounds such as benzyl acetate (Aldrich #B1,580-5), indole (Aldrich #26,907-7); lime and lemon flavor compounds such as citral (Aldrich #C8,300-7), α-terpineol (Aldrich #21,837-5); mandarin, orange, tangerine flavor compounds such as β-sinensal (CAS #8028-48-6), dimethyl anthranilate (CAS #85-91-6), thymol (Aldrich #11,209-7), octyl aldehyde, (Aldrich #O,560-8), decyl aldehyde (Aldrich #12,577-6); melon flavor compounds such as 2-methyl-3-4-tolylpropionaldehyde (CAS #16251-78-8), hydroxycitronellal dimethylacetal (CAS #141-92-4), 2,6-dimethyl-5-heptenal (CAS #106-72-9), 2-phenyl propionaldehyde (Aldrich #24,136-9), 2-methyl-3-(4-isopropylphenyl)propionaldehyde; maple flavor compounds such as 3-methyl-1,2-cyclopentanedione (Aldrich #17,850-0); peppermint and mint flavor compounds such as menthol (Aldrich #M,277-2); passion fruit flavor compounds such as 3-methylthio-1-hexanol (Aldrich #30,374-7); peach flavor compounds such as γ-undecalactone (Aldrich #U,80-6), 6-amyl-α-pyrone (CAS #27593-23-3); peanut flavor compounds such as 2,5-dimethylpyrazine (Aldrich #17,542-0); pear flavor compounds such as ethyl decane-cis-4-trans-2-dienoate (CAS #3025-30-7); pineapple flavor compounds such as allyl caproate (CAS #123-68-2), methyl-β-methylthiopropionate (Aldrich #10,337-3), allyl cyclohexane propionate (Aldrich #41,165-5); raspberry flavor compounds such as 6-methyl-α-ionone (CAS #79-69-6), trans-α-ionone (CAS #127-41-3), 4-(4-hydroxyphenyl)-2-butanone (Aldrich #17,851-9); strawberry flavor compounds such as ethyl maltol (CAS #4940-11-8), methyl cinnamate (Aldrich #17,328-2), 4-hydroxy-2,5-dimethyl-3(2H)-furanone (Aldrich #32,248-2), ethyl methyl phenylglycidate (CAS #77-83-8); and vanilla flavor compounds such as ethyl vanillin (Aldrich #12,809-0), propenyl quaethol (CAS #94-86-0).

In addition, the second coating contains at least one, for example from one to about five, luminescent compound capable of generating fluorescence, phosphorescence or chemiluminescence phenomenon, and which compounds are, for example, present in an amount of from about 0.5 part by weight to about 20 parts by weight and preferably from about 1 part by weight to about 15 parts by weight, and are selected from the group consisting of inorganic powder phosphors derived from calcium halophosphate, barium magnesium aluminate, magnesium aluminate, strontium chloropatite, zinc silicate and the oxides, oxysulfides, phosphates, vanadates and silicates of yttrium, gadolinium or lanthanum. Commonly used activators are rare-earth ions, such as europium II and III, terbium III, cerium III, and tin II. Fluorescent chemical compounds that convert UV radiation to visible radiation at the blue end of the spectrum and known as fluorescent whitening agents or optical brightners are derived from stilbene, coumarine and naphthalimide. Other fluorescent brightners are derived from fluorescent dyes as well as polymeric dyes such as polymeric phthalocyanines, and the like. Commercially sold pigment colors are dispersed in polymers such as polyamide or triazine-aldehyde-amide and are available from Day-Glo Color Corporation, such as Day-Glo-A-Series including A-17-N saturn yellow; A-18-N signal yellow; A-16-N arc yellow; A-15-N blaze orange; A-14-N fire orange; A-13-N rocket red; A-12 neon red; A-11 aurora pink; A-21 corona magenta; A-19 horizon blue; also included are materials from the Day-Glo-D-Series; Day-Glo-T-Series; Day-Glo-AX-Series; Day-Glo-SB-Series; Day-Glo-HM-Series; Day-Glo-HMS-Series; those dispersed in polyester or triazine-aldehyde-amide are available from Radiant Color Corporation including Radiant R-105-Series; including R-105-810 chartreuse; R-105-811 green; R-105-812 orange-yellow; R-105-813 orange; R-105-814 orange-red; R-105-815 red; R-105-816 cerise; R-105-817 pink; R-103-G-118 magenta; R-103-G-119 blue; also included are materials from the R- 203-G- series; R-P-1600-series; R-P-1700 series; R-XRB-series; R-K-500-series; and visiprint-series; those dispersed in triazine-aldehyde-amide are available from Lawter Chemicals including Lawter-B-Series including B-3539 lemon yellow; B-3545 green; B-3515 gold yellow; B-3514 yellow orange; B-3513 red orange; B-3534 red; B-3530 cerise red; B-3522 pink; B-3554 magenta; B-3556 vivid blue; also included are materials from the Lawter-G-3000-Series; Lawter-HVT-Series; are very suitable for the present application. Inorganic powder phosphors, polymer dispersed organic pigment phosphors as well as monomeric or polymeric dye based phosphors can be applied to various substrates via solvent coatings where the phosphor is compounded with a polymer and dispersed or dissolved in a solvent such as ethanol, esters, ketones, glycol ethers and water. The use of solvents, such as ethanol and water, is preferred because these are less toxic. Radiant polyester pigments are preferred primairly since they have a softening temperature of 110° C. The higher softening temperature of polyamide (150° C.) and triazine-aldehyde-amide (128° C. to 145° C.) pigments requires more heat for their lamination to other substrates.

In addition, the second coating contains lightfastness agents present in amounts of from about 0.5 part by weight to about 20 parts by weight and preferably from about 1 part by weight to about 15 parts by weight. These lightfastness agents are selected from (1) UV absorbing compounds, (2) antioxidant compounds, (3) antiozonant compounds, and (4) mixtures thereof. When a mixture of lightfastness compounds includes a UV absorbing compound and an antioxidant or an antiozonant compound, the UV compound is present in amounts of 0.5 part by weight to about 10 parts by weight and the antioxidant or the antiozonant compound is present in amounts of 0.5 part by weight to about 5 parts by weight. When a mixture of lightfastness compounds includes a UV absorbing compound, an antioxidant compound and an antiozonant compound, the UV compound is present in amounts of 0.5 part by weight to about 9 parts by weight, the antioxidant compound is present in amounts of 0.25 part by weight to about 3 parts by weight and the antiozonant compound is present in amounts of 0.25 part by weight to about 3 parts by weight.

Examples of UV absorbing compounds present in amounts of from about 0.5 part by weight to about 10 parts by weight and preferably from 0.5 part by weight to 9 parts by weight include glycerol 4-amino benzoate, available as Escalol 106 from Van Dyk Corporation; resorcinol mono benzoate, available as RBM from Eastman Chemicals; octyl dimethyl amino benzoate, available as Escalol 507 from Van Dyk Corporation; hexadecyl 3,5-di-tert-butyl-4-hydroxy-benzoate, available as Cyasorb UV-2908, #41,320-8, from Aldrich Chemical Company; octyl salicylate, available as Escalol 106 from Van Dyk Corporation; octyl methoxy cinnamate, available as Parasol MCX from Givaudan Corporation; 4-allyloxy-2-hydroxybenzophenone, available as Uvinul 600, #41,583-9, from Aldrich Chemical Company; 2-hydroxy-4-methoxy benzophenone, available as Anti UVA from Acto Corporation; 2,2'-dihydroxy-4,4'-dimethoxy benzophenone, available as Uvinul D49, #D11,100-7, from Aldrich Chemical Company; 2-hydroxy-4-(octyloxy) benzophenone, available as Cyasorb UV-531, #41,315-1, from Aldrich Chemical Company; 2-hydroxy-4-dodecyloxy benzophenone, available as DOBP from Eastman Chemicals; 2-(2'-hydroxy-5'-methylphenyl)benzotriazole, available as Tinuvin 900 from Ciba Geigy Corporation; 2-[2'-hydroxy-3,5-di-(1, 1 -dimethyl benzyl)phenyl]-2H-benzotriazole, available as Topanex 100BT from ICI America Corporation; bis[2-hydroxy-5-tert-octyl-3-(benzotriazol-2-yl)phenylmethane, available as Mixxim BB/100 from Fairmount Corporation; 2-(3',5'-di-tert-butyl-2'-hydroxy phenyl)-5-chlorobenzotriazole, available as Tinuvin 327 from Ciba Geigy Corporation; 2-(4-benzoyl-3-hydroxyphenoxy)ethylacrylate (Cyasorb-UV-416, #41,321-6, available from Aldrich Chemical Company), poly[2-(4-benzoyl- 3-hydroxyphenoxy)ethyl acrylate] (Cyasorb UV-2126, #41,323-2, available from Aldrich Chemical Company), N-(4-ethoxycarbonyl phenyl)-N'-ethyl-N'-phenyl formadine, available as Givesorb UV-2 from Givaudan Corporation; 1,1-(1,2-ethanediyl)bis(3,3,5,5-tetramethyl piperazinone), available as Good-rite UV 3034 from Goodrich Chemicals; tris(3,5-di-tert-butyl-4-hydroxybenzyl)isocyanurate, available as Good-rite UV 3114 from Goodrich Chemicals; nickel-bis(o-ethyl(3,5-di-tert-butyl-4-hydroxybenzyl)phosphonate), available as Irgastab 2002 from Ciba Geigy Corporation; (2,2,6,6-tetramethyl-4-piperidinyl)-1,2,3,4-butane-tetracarboxylate, available as Mixxim HALS 57 from Fairmount Corporation; [2,2,6,6-tetramethyl-4-piperidinyl/β,β,β',β'-tetramethyl-3,9-(2,4,8, 10-tetraoxospiro (5,5)undecane)diethyl]-1,2,3,4-butane tetracarboxylate, available as Mixxim HALS 68 from Fairmount Corporation; [1,2,2,6,6-pentamethyl-4-pieridinyl/β,β,β',β'-tetramethyl-3,9-(2,4,8,10-tetraoxospiro (5,5)undecane)diethyl]-1,2,3,4-butane tetracarboxylate, available as Mixxim HALS 63 from Fairmount Corporation; 2-dodecyl-N-(2,2,6,6-tetramethyl-4-piperidinyl) succinimide, available as Cyasorb UV-3581, #41,317-8, from Aldrich Chemical Company; 2-dodecyl-N-(1,2,2,6,6-pentamethyl-4-piperidinyl) succinimide, available as Cyasorb UV-3604, #41,318-6, from Aldrich Chemical Company; N-(1-acetyl-2,2,6,6-tetramethyl-4-piperidinyl)-2-dodecyl succinimide, available as Cyasorb UV-3668, #41,319-4, from Aldrich Chemical Company; tetra sodium N-(1,2-dicarboxyethyl)-N-octadecyl sulfosuccinamate, available as Aerosol 22N from American Cyanamid Corporation; nickeldibutyldithiocarbamate, available as UV-Chek AM-105 from Ferro Corporation; poly(4-hydroxy-2,2,6,6-tetramethyl-1-piperidine ethanol/dimethyl succinic acid), available as Tinuvin 622LD from Ciba-Geigy Corporation; poly(3,5-di-tert-butyl-4-hydroxy hydrocinnamic acid ester)/1,3,5-tris(2-hydroxyethyl)-5-triazine-2,4,6(1H,3H,5H)-trione, available as Good-rite 3125 from Goodrich Chemicals; poly[N,N-bis(2,2,6,6-tetramethyl-4-piperidinyl)-1,6-hexane diamine-co- 2,4-dichloro-6-morpholino-1,3,5-triazine], available as Cyasorb UV-3346, #41,324-0, from Aldrich Chemical Company; 1-[N-[poly(3-allyloxy-2-hydroxypropyl)-2-aminoethyl]-2-imidazolidinone], #41,026-8, available from Aldrich Chemical Company; and poly(2-ethyl-2-oxazoline), #37,284-6, #37,285-4, #37,397-4, available from Aldrich Chemical Company.

Examples of lightfastness antioxidant compounds present in amounts of from about 0.5 to about 5 percent by weight and preferably from 0.25 to 3 parts by weight include didodecyl-3,3'-thiodipropionate, available as Cyanox, LTDP, #D12,840-6, from Aldrich Chemical Company; ditridecyl-3,3'-thiodipropionate, available as Cyanox 711, #41,311-9, from Aldrich Chemical Company; ditetradecyl-3,3'-thiodipropionate, available as Cyanox, MTDP, #41,312-7, from Aldrich Chemical Company; dicetyl-3,3'-thiodipropionate, available as Evanstab 16 from Evans Chemetics Corporation; dioctadecyl-3,3'-thiodipropionate, available as Cyanox, STDP, #41,310-0, from Aldrich Chemical Company; triethyleneglycol bis[3-(3'-tert-butyl-4'-hydroxy-5'-methylphenyl) propionate], available as Irganox 245 from Ciba-Geigy Corporation; octadecyl-3-(3,5-di-tert-butyl-4-hydroxyphenyl)propionate, available as Ultranox 276 from General Electric Company; 1,6-hexamethylene bis(3,5-di-tert-butyl-4-hydroxy hydrocinnamate), available as Irganox 259 from Ciba-Geigy Corporation; tetrakis[methylene(3,5-di-tert-butyl-4-hydroxy)hydrocinnamate], available as Irganox 1010 from Ciba-Geigy Corporation; thiodiethylene bis(3,5-di-tert-butyl-4-hydroxy)hydrocinnamate, available as Irganox 1035 from Ciba-Geigy Corporation; octadecyl-3,5-di-tert-butyl-4-hydroxy hydrocinnamate, available as Irganox 1076 from Ciba-Geigy Corporation; N,N'-hexamethylenebis(3,5-di-tert-butyl-4-hydroxy hydrocinnamide), available as Irganox 1098 from Ciba-Geigy; 2,2-bis[4-(2-(3,5-di-tert-butyl-4-hydroxy-hydrocinnamoyloxy))ethoxyphenyl] propane, available as Topanol 205 from ICI America Corporation; N-stearoyl-4-amino phenol, available as Sucnox-18 from Hexcel Corporation; 2,6-di-tert-butyl-4-methyl phenol, available as Ultranox 226 from General Electric Company; 2,6-di-tert-butyl-4-cresol, available as Vulkanox KB from Mobay Chemicals; 2,6-di-tert-butyl-α-dimethylamino-4-cresol, available as Ethanox 703 from Ethyl Corporation; 2,2'-isobutylidene-bis(4,6-dimethyl phenol), available as Vulkanox NKF, from Mobay Chemicals; 2,2'-methylene bis(6-tert-butyl-4-methylphenol), available as Cyanox 2246, #41,315-5, from Aldrich Chemical Company; 2,2'-methylene bis(6-tert-butyl-4-ethylphenol), available as Cyanox 425, #41,314-3, from Aldrich Chemical Company; tris(4-tert-butyl-3-hydroxy-2,6-dimethylbenzyl) isocyanurate, available as Cyanox 1790, #41,322-4, LTDP, #D12,840-6, from Aldrich Chemical Company; 1,3,5-trimethyl-2,4,6-tris(3,5-di-tert-butyl-4-hydroxybenzyl) benzene, available as Ethanox 300, #41,328-3, from Aldrich Chemical Company; triphenyl phosphite, available as Lankromark LE65 from Harcros Corporation; tris(nonyl phenyl) phosphite, available as Lankromark LE109 from Harcros Corporation; tris(2,4-di-tert-butyl-phenyl)phosphite, available as Wytox 240 from Olin Corporation; 2,2'-ethylidene bis(4,6-di-tert-butylphenyl)fluorophosphonite, available as Ethanox-398 from Ethyl Corporation; octylated diphenylamine, available as Anchor-ODPA from Anchor Corporation; N,N'-α,α'-naphthalene-4-phenylene diamine, available as Anchor DNPD from Anchor Corporation; 4,4'-methylene-bis(dibutyldithio carbamate), available as Vanlube 7723 from Vanderbilt Corporation; antimony dialkyldithio carbamate, available as Vanlube 73 from Vanderbilt Corporation; antimony dialkylphosphorodithioate, available as Vanlube 622 from Vanderbilt Corporation; molybdenum oxysulfide dithio carbamate, available as Vanlube 622 from Vanderbilt Corporation; and 2,2,4-trimethyl-1,2-hydroquinoline, available as Vulkanox HS from Mobay Corporation.

Examples of lightfastness antiozonants present in amounts of from about 0.25 percent by weight to about 3 percent by weight include N-isopropyl-N'-phenyl-phenylene diamine, available as Santoflex IP from Monsanto Chemicals; N-(1,3-dimethylbutyl)-N'-phenyl-phenylene diamine, available as Santoflex 13 from Monsanto Chemicals; N,N'-di(2-octyl)-4-phenylene diamine, available as Antozite-1 from Vanderbilt Corporation; N,N-bis(1,4-dimethyl pentyl)-4-phenylene diamine, available as Santoflex 77 from Monsanto Chemicals; 2,4,6-tris-(N-1,4-dimethylpentyl-4-phenylenediamino)-1,3,5-triazine, available as Durazone-37 from Uniroyal Corporation; 6-ethoxy-1,2-dihydro-2,2,4-trimethyl quinoline, available as Santoflex AW from Monsanto Chemicals; bis-(1,2,3,6-tetrahydro benzaldehyde) pentaerythritol acetal, available as Vulkazon AFS/LG from Mobay Corporation; Paraffin Wax, available as Petrolite C-700, Petrolite C-1035, from Petrolite Corporation; and mixtures thereof.

In addition, the second coating contains antistatic agents/compounds present in amounts of from about 0.5 part by weight to about 20 parts by weight and preferably from about 1 part by weight to about 15 parts by weight. Suitable antistatic agents include both anionic and cationic materials. Monoester sulfosuccinates, diester sulfosuccinates and sulfosuccinamates are anionic antistatic components which have been found suitable for use in the present coatings. Suitable cationic antistatic components comprise diamino alkanes; quaternary salts; quaternary acrylic copolymer latexes, such as HX-42-1, HX-42-3 available from Inter Polymer Corporation; ammonium quaternary salts as disclosed in U.S. Pat. No. 5,320,902; phosphonium quaternary salts as disclosed in copending application U.S. Ser. No. 08/034,917; and sulfonium, thiazolium and benzothiazolium quaternary salts as disclosed in U.S. Pat. No. 5,314,747, the disclosure of which is totally incorporated herein by reference.

Antistatic agents of the second and third layer may also be selected from anionic (1) esters of succinic acid such as sulfosuccinic acid (Alkasurf SS-O-75 [sodium dioctyl sulfosuccinate], Alkasurf SS-DA4-HE [ethoxylated alcohol sulfosuccinate], Alkasurf SS-L7DE [sodium sulfosuccinate ester of lauric diethanol amide], Alkasurf SS-L-HE (sodium lauryl sulfosuccinate], Alkaril Chemicals), (2) esters of sulfonic acid (Alkasurf CA [calcium dodecyl benzene sulfonate], Alkasurf 1PAM [isopropylamine dodecyl benzene sulfonate], Alkaril Chemicals), (3) alkyl amines (Alkamide SDO [soya diethanol amide], Alkamide CDE [coco diethanol amide], Alkamide CME [coco monoethanol amide], Alkamide L9DE [lauric diethanol amide], Alkamide L7Me [lauric monoethanol amide], Alkamide L1PA [lauric monoisopropylamide], Alkaril Chemicals).

The second coating can contain filler/pigment compounds present in amounts of from about 0.5 part by weight to about 10 parts by weight and preferably from about 1 part by weight to about 10 parts by weight. Examples of pigment components include zirconium oxide (SF-EXTRA available from Z-Tech Corporation), colloidal silicas, such as Syloid 74 available from Grace Company (preferably present, in one embodiment, in an amount of from about 1 to about 10 parts by weight), titanium dioxide (available as Rutile or Anatase from NL Chem Canada, Inc.), hydrated alumina (Hydrad TMC-HBF, Hydrad TM-HBC, available from J.M. Huber Corporation), barium sulfate (K.C. Blanc Fix HD80, available from Kali Chemie Corporation), calcium carbonate (Microwhite Sylacauga Calcium Products), high brightness clays (such as Engelhard Paper Clays), calcium silicate (available from J.M. Huber Corporation), cellulosic materials insoluble in water or any organic solvents (such as those available from Scientific Polymer Products), blend of calcium fluoride and silica, such as Opalex-C available from Kemira O.Y, zinc oxide, such as Zoco Fax 183, available from Zo Chem, blends of zinc sulfide with barium sulfate, such as Lithopane, available from Schteben Company, and the like, and mixtures thereof. Pigments can enhance color mixing and assist in improving print-through with the recording sheets of the present invention.

The second abrasion resistant coating is further coated with a third adhesive coating. This third adhesive coating in contact with the second abrasion resistant layer is comprised of a binder having a glass transition temperature of between −50° C. to about 55° C. present in an amount of about 96 parts by weight to about 70 parts by weight, an antistatic agent present in an amount of from about 2 parts by weight to about 15 parts by weight, a lightfastness composition present in an amount of from about 2 parts by weight to about 15 parts by weight. Based on 100 parts, the three ingredients, such as (1) binder, (2) antistatic agent, (3) a lightfastness composition, and the third coating has the following preferred composition range from [96+2+2=100] to [70+15+15=100].

Examples of suitable adhesive polymers for use as third coating for adhering backing substrates to imaged substrates present in amounts of from about 99 parts by weight to about 60 parts by weight and preferably from about 96 parts by weight to about 70 parts by weight include water dispersible polymers such as:

(A) latex polymers present in amounts of from about 99 parts by weight to about 60 parts by weight and preferably from about 96 parts by weight to about 70 parts by weight, such as rubber latex such as neoprene available from Serva Biochemicals, polyester latex such as Eastman AQ 29D available from Eastman Chemical Company, polyvinyl chloride latex, such as Geon 352 from B.F. Goodrich Chemical Group, ethylene-vinyl chloride copolymer emulsions, such as Airflex ethylene-vinyl chloride from Air Products and Chemicals, polyvinyl acetate homopolymer emulsions, such as Vinac from Air Products and Chemicals, carboxylated vinyl acetate emulsion resins, such as Synthemul synthetic resin emulsions 40-502, 40-503, and 97-664 from Reichhold Chemicals Inc. and Polyco 2149, 2150, and 2171 from Rohm and Haas Company, vinyl acetate copolymer latex, such as 76 RES 7800 from Union Oil Chemicals Divisions and Resyn 25-1103, Resyn 25-1109, Resyn 25-1119, and Resyn 25-1189 from National Starch and Chemical Corporation, ethylene-vinyl acetate copolymer emulsions, such as Airflex ethylene-vinylacetate from Air Products and Chemicals Inc., acrylic-vinyl acetate copolymer emulsions, such as Rhoplex AR-74 from Rohm and Haas Company, Synthemul 97-726 from Reichhold Chemicals Inc., Resyn 25-1140, 25-1141, 25-1142, and Resyn-6820 from National Starch and Chemical Corporation, vinyl acrylic terpolymer latex, such as 76 RES 3103 from Union Oil Chemical Division and Resyn 25-1110 from National Starch and Chemical Corporation, acrylic emulsion latex, such as Rhoplex B-15J, Rhoplex P-376, Rhoplex TR-407, Rhoplex E-940, Rhoplex TR-934, Rhoplex TR-520, Rhoplex HA-24, and Rhoplex NW-1825 from Rohm and Haas Company and Hycar 2600 X322, Hycar 2671, Hycar 2679, Hycar 26120, and Hycar 2600 X347 from B.F. Goodrich Chemical Group, polystyrene latex, such as DL6622A, DL6688A, and DL6687A from Dow Chemical Company, styrene-butadiene latexes, such as 76 RES 4100 and 76 RES 8100 available from Union Oil Chemicals Division, Tylac resin emulsion 68-412, Tylac resin emulsion 68-067, 68-319, 68-413, 68-500, 68-501, available from Reichhold Chemical Inc., and DL6672A, DL6663A, DL6638A, DL6626A, DL6620A, DL615A, DL617A, DL620A, DL640A, DL650A from Dow Chemical Company, butadiene-acrylonitrile latex, such as Hycar 1561 and Hycar 1562 from B.F. Goodrich Chemical Group and Tylac Synthetic Rubber Latex 68-302 from Reichhold Chemicals Inc., butadiene-acrylonitrile-styrene terpolymer latex, such as Tylac synthetic rubber latex 68-513 from Reichhold Chemicals Inc., and the like, as well as mixtures thereof;

(B) water soluble polymers present in amounts of from about 99 parts by weight to about 60 parts by weight and preferably from about 96 parts by weight to about 70 parts by weight amounts such as formaldehyde resins, such as melamine-formaldehyde resin (such as BC 309, available from British Industrial Plastics Limited), urea-formaldehyde resin (such as BC777, available from British Industrial Plastics Limited), and alkylated ureaformaldehyde resins, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as methylated urea-formaldehyde resins, available from American Cyanamid Company as Beetle 65); maleic anhydride and maleic acid containing polymers, such as vinyl alkyl ether-maleic anhydride copolymers, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as vinyl methyl ether-maleic anhydride copolymer #173, available from Scientific Polymer Products), alkylene-maleic anhydride copolymers, wherein alkylene has at least one carbon atom, and wherein the number of carbon atoms is such that the material is water soluble, preferably from 1 to about 20 carbon atoms, more preferably from 1 to about 10 carbon atoms, such as methyl, ethyl, propyl, butyl, and the like (such as ethylene-maleic anhydride copolymer #2308, available from Poly Sciences Inc., also available as EMA from Monsanto Chemical Company), butadiene-maleic acid copolymers (such as #07787, available from Poly Sciences Inc.), octadecene-1-maleic anhydride copolymer, such as #573 available from Scientific Polymer Products, vinylalkylether homopolymer, such as polyvinylmethylether #025 available from Scientific Polymer Products, and vinylalkylether-maleic acid copolymers, wherein alkyl has at least one carbon atom, and wherein the number of carbon atoms is such that the material is water soluble, preferably from 1 to about 20 carbon atoms, more preferably from 1 to about 10 carbon atoms, such as methyl, ethyl, propyl, butyl, and the like (such as vinylmethylether-maleic acid copolymer, available from GAF Corporation as Gantrez S-95), and alkyl vinyl ether-maleic acid esters, wherein alkyl has at least one carbon atom, and wherein the number of carbon atoms is such that the material is water soluble, preferably from 1 to about 20 carbon atoms, more preferably from 1 to about 10 carbon atoms, such as methyl, ethyl, propyl, butyl, and the like (such as methyl vinyl ether-maleic acid ester #773, available from Scientific Polymer Products); and (C) solvent soluble polymers present in amounts of from about 99 parts by weight to about 60 parts by weight and preferably from about 96 parts by weight to about 70 parts by weight, such as poly(hydroxyalkyl methacrylates), wherein alkyl has from 1 to about 18 carbon atoms, including methyl, ethyl, propyl, butyl, hexadecyl, and the like, including poly(2-hydroxyethylmethacrylate), such as #414, #815, available from Scientific Polymer Products, and poly (hydroxy propylmethacrylate), such as #232 available from Scientific Polymer Products, poly(hydroxyalkylacrylates), wherein alkyl is methyl, ethyl, or propyl, including poly(2-hydroxyethyl acrylate), such as #850 available from Scientific Polymer Products, and poly(hydroxypropyl acrylate), such as #851 available from Scientific Polymer Products, alkyl cellulose or aryl cellulose, wherein alkyl is methyl, ethyl, propyl, or butyl and aryl is phenyl or the like, including ethyl cellulose, such as Ethocel N-22 available from Hercules Chemical Company, poly(vinylacetate), such as #346, #347 available from Scientific Polymer Products, and the like; ketone soluble polymers, such as those polymers soluble in acetone, including hydroxyalkyl cellulose acrylates and hydroxyaryl cellulose acrylates, wherein alkyl is methyl, ethyl, propyl, or butyl and aryl is phenyl or the like, including hydroxyethyl cellulose acrylate, such as #8630 available from Monomer-Polymer and Dajac Laboratories Inc., hydroxyalkyl cellulose methacrylates and hydroxyaryl cellulose methacrylates, wherein alkyl is methyl, ethyl, propyl, or butyl and aryl is phenyl or the like, including hydroxyethyl cellulose methacrylate, such as #8631 available from Monomer-Polymer and Dajac Laboratories Inc., polyalkylmethacrylates wherein alkyl has from 3 to about 18 carbon atoms, including propyl, butyl, hexadecyl, and the like, including poly(n-propyl methacrylate), such as #828 available from Scientific Polymer Products, poly(n-butyl methacrylate), such as #213 available from Scientific Polymer Products, poly(n-butyl methacrylate-co-isobutylmethacrylate), such as #209 available from Scientific Polymer Products, poly(tert-butylaminoethyl methacrylate), such as #882 available frgm Scientific Polymer Products, poly(n-hexyl methacrylate), such as #217 available from Scientific Polymer Products, poly(2-ethylhexyl methacrylate), such as #229 available from Scientific Polymer Products, poly(n-decylmeth acrylate), such as #884 available from Scientific Polymer Products, poly(isodecyl methacrylate), such as #220 available from Scientific Polymer Products, poly(lauryl methacrylate), such as #168 available from Scientific Polymer Products, poly(octadecyl methacrylate), such as #167 available from Scientific Polymer Products; polyalkylenes and their copolymers wherein alkyl has from 2 to about 6 carbon atoms, including, ethyl, propyl, butyl, including polyethylene, such as #041, #042, #535, #536, #558, #560, available from Scientific Polymer Products, and #26,935-2; #42,803-5; #42,807-8; #42,808-6; #42,809-4; #42,810-8; #42,796-9; #42,798-5; #42,799-3; #42,901-5; #42,777-2; #42,778-0; #42,779-9, available from Aldrich Chemical Company, polypropylene such as #130, #780, #781, #782, #783, available from Scientific Polymer Products, and #42, 811-6; #42,902-3, available from Aldrich Chemical Company, poly(1-butene), such as #128, #337, #338, available from Scientific Polymer Products, poly(propylene-co-ethylene)copolymer, such as #454, #455 available from Scientific Polymer Products and #42,792-6; #42,795-0; #42, 794-2; #42,913-9; #42,819-1; #42,820-5; available from Aldrich Chemical Company, poly(ethylene-co-1-butene) copolymer, such as #43,469-8; #43,472-8 available from Aldrich Chemical Company, poly(ethylene-co-1-butene-co-1-hexene) copolymer, such as #43,474-4; #43,475-2 available from Aldrich Chemical Company, poly(ethylene-co-methylacrylate)copolymer, such as #43,263-6; #43,264-4; #43,265-2 available from Aldrich Chemical Company, poly (ethylene-co-methylacrylate-co-glycidyl methacrylate) copolymer, such as #43,364-0 available from Aldrich Chemical Company, poly(ethylene-co-ethylacrylate) copolymer, such as #358 available from Scientific Polymer Products, poly(ethylene-co-ethylacrylate-co-maleic anhydride)copolymer, such as #43,083-8; #43,084-6 available from Aldrich Chemical Company, poly(ethylene-co-butylacrylate)copolymer, such as #43,077-3; #43,078-1 available from Aldrich Chemical Company, poly(ethylene-co-butylacrylate-co-carbon monoxide) copolymer, such as #43,064-1; #43,066-8 available from Aldrich Chemical Company, poly(ethylene-co-glycidylyl methacrylate) copolymer, such as #43,086-2 available from Aldrich Chemical Company, poly(ethylene-co-carbon monoxide) copolymer, such as #42,835-3 available from Aldrich Chemical Company, poly(ethylene-co-acrylic acid) copolymer, such as #42,671-7; #42,672-5 available from Aldrich Chemical Company, poly(ethylene-co-acrylic acid) copolymer sodium salt, such as #42,674-1; #42,673-3 available from Aldrich Chemical Company, poly(ethylene-co-acrylic acid)copolymer zinc salt, such as #42,676-6; #42, 676-8 available from Aldrich Chemical Company, poly (ethylene-co-methacrylic acid)copolymer, such as #42,662-8; #42,663-6; #42,664-4; available from Aldrich Chemical Company, poly(ethylene-co-methacrylic acid) copolymer lithium salt, such as #42,670-9 available from Aldrich Chemical Company, poly(ethylene-co-methacrylic acid) copolymer sodium salt, such as #42,669-5 available from Aldrich Chemical Company, poly(ethylene-co-methacrylic acid)copolymer zinc salt, such as #42,668-7; #42,666-0 available from Aldrich Chemical Company, poly(ethylene-co-vinyl acetate-co-methacrylic acid)copolymer, such as #42,654-7; #42,655-5 available from Aldrich Chemical Company, poly(ethylene-co-vinyl acetate-co-carbon monoxide)copolymer, such as #43,062-5 available from Aldrich Chemical Company, poly(ethylene-co-vinyl acetate)-graft-poly(maleic anhydride)copolymer, such as #42,652-0; #42,653-9 available from Aldrich Chemical Company, poly(ethylene)-graft-poly(maleic anhydride) copolymer, such as #42,650-4; #42,781-0 available from Aldrich Chemical Company, poly(propylene-co-1-butene) copolymer, such as #42,822-1 available from Aldrich Chemical Company, poly(propylene-co-1-hexene) copolymer, such as #42,824-8 available from Aldrich Chemical Company, poly(propylene-co-1-butene-co-ethylene)copolymer, such as #42,825-6 available from Aldrich Chemical Company, poly(propylene)-graft-poly(maleic anhydride) copolymer, such as #42,651-2; #42,784-5 available from Aldrich Chemical Company, poly(isobutylene-co-isoprene)copolymer, such as #874 available from Scientific Polymer Products, epoly(ethylene-co-propylene-co-diene) terpolymer, such as #350, #360, #448, #449 available from Scientific Polymer Products; polydienes and their copolymers including polychloroprene such as #196, #502, #503, #504 available from Scientific Polymer Products, polystyrene-block-polyisoprene, such as #43,246-6 available from Aldrich Chemical Company, polystyrene-block-polybutadiene, such as #43,248-2; #43,249-0 available from Aldrich Chemical Company, polystyrene-block-polyisoprene-block-polystyrene such as #43,239-3; #43, 240-7; #43,241-5 available from Aldrich Chemical Company, polystyrene-block-poly(ethylene-random-butylene)-block-polystyrene, such as #43,245-8 available from Aldrich Chemical Company, vinylalkylether polymers including polyvinylmethylether, such as #450 available from Scientific Polymer Products, polyvinylisobutylether, such as #425 available from Scientific Polymer Products; polyvinyl esters including poly(vinyl stearate), such as #103 available from Scientific Polymer Products, poly(vinyl propionate), such as #303 available from Scientific Polymer Products, poly(vinyl pivalate), such as #306 available from Scientific Polymer Products, poly(vinyl neodecanoate), such as #267 available from Scientific Polymer Products, polyvinyl acetate, such as #346, #347 available from Scientific Polymer Products, low melt polyesters including poly (ethylene adipate), such as #147 available from Scientific Polymer Products, poly(ethylene succinate), such as #149 available from Scientific Polymer Products, poly(ethylene azelate), such as #842 available from Scientific Polymer Products, poly(1,4-butylene adipate), such as #150 available from Scientific Polymer Products, poly(trimethylene adipate), such as #594 available from Scientific Polymer Products, poly(trimethylene glutarate), such as #591 available from Scientific Polymer Products, poly(trimethylene succinate), such as #592 available from Scientific Polymer Products, poly(hexamethylene succinate), such as #124 available from Scientific Polymer Products, poly(diallyl phthalate), such as #010 available from Scientific Polymer Products, poly(diallyl isophthalate), such as #011 available from Scientific Polymer Products, poly(vinylidene chloride-co-methyl acrylate), such as #43,040-4 available from Aldrich Chemical Company, poly(vinylidene fluoride-co-hexafluoropropylene), such as #42,716-0 available from Aldrich Chemical Company, poly(chloro trifluoroethylene), such as #42,691-1 available from Aldrich Chemical Company, as well as blends or mixtures of any of the above. Any mixtures of the above ingredients in any relative amounts can be employed.

Further, the third coating can contain lightfastness agents present in amounts of from about 0.5 part by weight to about 20 parts by weight and preferably from about 2 parts by weight to about 15 parts by weight including UV absorbing compounds, antioxidants and antiozonants similar to the ones used in the second coating including glycerol-4-amino benzoate, available as Escalol 106 from Van Dyk Corporation; resorcinol mono benzoate, available as RBM from Eastman Chemicals; octyl dimethyl amino benzoate, available as Escalol 507 from Van Dyk Corporation; didodecyl-3,3'-thiodipropionate, available as Cyanox, LTDP, #D12, 840-6, from Aldrich Chemical Company; ditridecyl-3,3'-thiodipropionate, available as Cyanox 711, #41,311-9, from Aldrich Chemical Company); N-isopropyl-N'-phenyl-phenylenediamine, available as Santoflex-IP from Monsanto Chemicals; N-(1,3-dimethylbutyl)-N'-phenyl-phenylene diamine, available as Santoflex 13 from Monsanto Chemicals; N,N'-di(2-octyl)-4-phenylene diamine, available as Antozite-1 from Vanderbilt Corporation; and the like.

The third adhesive coating may contain optional biocides. Examples of suitable biocides include (A) nonionic biocides, such as (1) 2-hydroxy propyl methane thiosulfonate (Busan 1005 available from Buckman Laboratories Inc.); (2) 2-(thio cyanomethyl thio)benzothiazole (Busan 30WB, 72WB, available from Buckman Laboratories Inc.); (3) methylene bis(thiocyanate) (Metasol T-10 available from Calgon Corporation; AMA-110 available from Vinings Chemical Company; VICHEM MBT available from Vineland Chemical Company; Aldrich #10,509-0); (4) 2-bromo-4'-hydroxyacetophenone (Busan 90 available from Buckman Laboratories); (5) 1,2-dibromo-2,4-dicyano-butane (Metasol CB-210, CB-235, available from Calgon Corporation); (6) 2,2-dibromo-3-nitropropionamide (Metasol RB-20 available from Calgon Corporation; Amerstat 300 available from Drew Industrial Div.); (7) N-α-(1-nitroethyl benzylethylene diamine) (Metasol J-26 available from Calgon Corporation); (8) dichlorophene (G-4 available from Givaudan Corporation); (9) 3,5-dimethyl tetrahydro-2H-1,3,5-thiadiazine-2-thione (Slime-Trol RX-28 available from Betz Paper Chem Inc.; Metasol D3T-A available from Calgon Corporation; Slime Arrest available from Western Chemical Company); (10) a nonionic blend of a sulfone, such as bis(trichloromethyl)sulfone and methylene bisthiocyanate (available as Slime-Trol RX-38A from Betz Paper Chem Inc.); (11) a nonionic blend of methylene bisthiocyanate and bromonitrostyrene (available as Slime-Trol RX-41 from Betz Paper Chem Inc.); (12) a nonionic blend of 2-(thiocyanomethylthio)benzothiazole (53.2 parts by weight) and 2-hydroxypropyl methanethiosulfonate (46.8 parts by weight) (available as Busan 25 from Buckman Laboratories Inc.); (13) a nonionic blend of methylene bis(thiocyanate), 50 parts by weight, and 2-(thiocyanomethylthio) benzothiazole, 50 parts by weight, (available as Busan 1009, 1009WB from Buckman Laboratories Inc.); (14) a nonionic blend of 2-bromo-4'-hydroxyacetophenone, 70 parts by weight, and 2-(thiocyanomethylthio) benzothiazole, 30 parts by weight, (Busan 93 available from Buckman Laboratories Inc.); (15) a nonionic blend of 5-chloro-2-methyl-4-isothiazoline-3-one, 75 parts by weight, and 2-methyl-4-isothiazoline-3-one, 25 parts by weight, (available as Amerstat 250 from Drew Industrial Division; Nalcon 7647 from Nalco Chemical Company; Kathon LX from Rohm and Haas Company); and the like, and mixtures thereof; (B) anionic biocides, such as (1) anionic potassium N-hydroxymethyl-N-methyl-dithiocarbamate (available as Busan 40 from Buckman Larboratories Inc.); (2) an anionic blend of N-hydroxymethyl-N-methyl dithiocarbamate, 80 parts by weight, and sodium 2-mercapto benzothiazole, 20 parts by weight, (available as Busan 52 from Buckman Laboratories Inc.); (3) an anionic blend of sodium dimethyl dithiocarbamate, 50 parts by weight, and disodium ethylenebis-dithiocarbamate, 50 parts by weight, (available as Metasol 300 from Calgon Corporation; Amerstat 272 from Drew Industrial Division; Slime Control F from Western Chemical Company); (4) an anionic blend of N-methyldithiocarbamate, 60 parts by weight, and disodium cyanodithio imido carbonate, 40 parts by weight, (available as Busan 881 from Buckman Laboratories Inc.); (5) an anionic blend of methylene bis-thiocyanate, 33 parts by weight, sodium dimethyl-dithiocarbamate, 33 parts by weight, and sodium ethylene bisdithiocarbamate, 33 parts by weight, (available as Amerstat 282 from Drew Industrial Division; AMA-131 from Vinings Chemical Company); (6) sodium dichlorophene (G-4-40 available from Givaudan Corporation); and the like, and mixtures thereof; (C) cationic biocides, such as (1) cationic poly(oxyethylene (dimethylamino)-ethylene(dimethylamino)ethylene dichloride) (Busan 77 available from Buckman Laboratories Inc.); (2) a cationic blend of methylene bisthiocyanate and dodecyl guanidine hydrochloride (available as Slime-Trol RX-31, RX-32, RX-32P, RX-33, from Betz Paper Chem Inc.); (3) a cationic blend of a sulfone, such as bis (trichloromethyl) sulfone and a quaternary ammonium chloride (available as Slime-Trol RX-36 DPB-865 from Betz Paper Chem. Inc.); (4) a cationic blend of methylene bisthiocyanate and chlorinated phenols (available as Slime-Trol RX-40 from Betz Paper Chem Inc.); and the like, and mixtures thereof. The biocide can be present in any effective amount; typically, the biocide is present in an amount of from about 0.1 part by weight to about 3 parts by weight of the coating, although the amount can be outside this range.

The third adhesive coating is further overcoated with a fourth coating present in amounts of 100 parts by weight and which coating/layer is comprised of a hydrophilic polymer which serves as a protective layer for the third coating, and can also function as a ink/toner wetting agent.

Examples of suitable hydrophilic binder polymers for use in the fourth coating for preventing premature activation of adhesive polymers comprising the third coating, and which serves as an ink/toner wetting agent including poly (oxymethylene), such as #009 available from Scientific Polymer Products, poly(oxyethylene) or poly(ethylene oxide), such as POLY OX WSRN-3000 available from Union Carbide Corporation, ethylene oxide/propylene oxide copolymers, such as ethylene oxide/propylene oxide/ ethylene oxide triblock copolymer, such as Alkatronic EGE-31-1 available from Alkaril Chemicals, propylene oxide/ ethylene oxide/propylene oxide triblock copolymers, such as Alkatronic PGP 3B-1 available from Alkaril Chemicals, tetrafunctional block copolymers derived from the sequential addition of ethylene oxide and propylene oxide to ethylene diamine, the content of ethylene oxide in these block copolymers being from about 5 to about 95 parts by weight, such as Tetronic 50R8, available from BASF Corporation, ethylene oxide/2-hydroxyethylmethacrylate/ ethylene oxide and ethylene oxide/hydroxypropyl methacrylate/ethylene oxide triblock copolymers, which can be synthesized via free radical polymerization of hydroxyethyl methacrylate or hydroxypropyl methacrylate with 2-aminoethanethiol using α,α'-azobis isobutyronitrile as initiator and reacting the resulting amino-semitelechelic oligo-hydroxyethyl methacrylate or amino-hydroxypropyl methacrylate with an isocyanate-polyethylene oxide complex in chlorobenzene at 0° C., and precipitating the reaction mixture in diethylether, filtering and drying in vacuum, ethylene oxide/4-vinyl pyridine/ethylene oxide triblock copolymers, which can be synthesized via anionic polymerization of 4-vinyl pyridine with sodium naphthalene as initiator at −78° C. and then adding ethylene oxide monomer, the reaction being carried out in an explosion proof stainless steel reactor, ionene/ethylene oxide/ionene triblock copolymers, which can be synthesized via quaternization reaction of one end of each 3—3 ionene with the halogenated (preferably brominated) poly(oxyethylene) in methanol at about 40° C., ethylene oxide/isoprene/ethylene oxide triblock copolymers, which can be synthesized via anionic polymerization of isoprene with sodium naphthalene in tetrahydrofuran as solvent at −78° C., and then adding monomer ethylene oxide and polymerizing the reaction for three days, after which time the reaction is quenched with methanol, the ethylene oxide content in the aforementioned triblock copolymers being from about 20 to about 70 parts by weight and preferably about 50 parts by weight, and the like, and epichlorohydrin-ethyleneoxide copolymer, such as #155 available from Scientific Polymer Products.

The fourth coating in contact with the third coating composition is present on one surface of the backing substrate of the present invention in any effective thickness. Typically, the total thickness of the third coating layer is from about 0.1 to about 25 microns and preferably from about 0.5 to 10 microns, although the thickness can be outside of these ranges.

The coating compositions discussed above can be applied to the substrates by any suitable technique. For example, the coatings can be applied by a number of known techniques, including melt extrusion, reverse roll coating, solvent extrusion, and dip coating processes. In dip coating, a web of material to be coated is transported below the surface of the coating material (which generally is dissolved in a solvent) by a single roll in such a manner that the exposed site is saturated, followed by the removal of any excess coating by a blade, bar, or squeeze roll; the process is then repeated with the appropriate coating materials for application of the other layered coatings. With reverse roll coating, the premetered coating material (which generally is dissolved in a solvent) is transferred from a steel applicator roll onto the web material to be coated. The metering roll is stationary or is rotating slowly in the direction opposite to that of the applicator roll. In slot extrusion coating, a flat die is used to apply coating material (which generally is dissolved in a solvent) with the die lips in close proximity to the web of material to be coated. The die can have one or more slots if multilayers are to be applied simultaneously. In the multilayer slot coating, the coating solutions form a liquid stack in the gap where the liquids come in the contact with the moving web to form a coating. The stability of the interface between the two layers depends on wet thickness, density and viscosity ratios of both layers which need to be kept as close to one as possible. Once the desired amount of coating has been applied to the web, the coating is dried, typically at from about 25 to about 100° C. in an air drier.

Glossy, imaged substrates of the present invention exhibit reduced curl, for example between 5 to 10 millimeters, upon being printed with solid inks. Generally, the term "curl" refers to the distance between the base line of the arc formed by imaged substrates when viewed in cross-section across its width (or shorter dimension, for example, 8.5 inches in an 8.5 by 11 inch sheet, as opposed to length, or longer dimension, for example, 11 inches in an 8.5 by 11 inch sheet) and the midpoint of the arc. To measure curl, a sheet can be held with the thumb and forefinger in the middle of one of the long edges of the sheet (for example, in the middle of one of the 11 inch edges in an 8.5 by 11 inch sheet) and the arc formed by the sheet can be matched against a pre-drawn standard template curve.

The gloss values recited herein were obtained on a 75° Glossmeter, Glossgard II from Pacific Scientific (Gardner/Neotec Instrument Division).

The optical density measurements recited herein were obtained on a Pacific Spectrograph Color System. The system consists of two major components, an optical sensor and a data terminal. The optical sensor employs a 6 inch integrating sphere to provide diffuse illumination and 2 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters, and the entry of tristimulus values, and an alphanumeric keyboard for entry of product standard information. The print through value as characterized by the printing industry is Log base 10 (reflectance of a single sheet of unprinted paper against a black background/reflectance of the back side of a black printed area against a black background) measured at a wavelength of 560 nanometers.

Specific embodiments of the invention will now be described in detail. These Examples are intended to be illustrative, and the invention is not limited to the materials, conditions, or process parameters set forth in these embodiments. All parts and percentages are by weight unless otherwise indicated.

EXAMPLE I

Preparation of the First Release Coating:

Twenty coated backing substrates were prepared by the solvent extrusion process (single side each time initially) on a Faustel Coater using a one slot die, by providing for each MYLAR® (roll form) with a thickness of 75 microns with a first release coating of a blend comprised of 75 parts by weight of α-methylstyrene-dimethylsiloxane block copolymer, PS 0965 available from Petrarch Systems, and 25 parts by weight of a monomeric release material 1,7-dichloro octamethyl tetra siloxane (Aldrich #38,437-2) in a thickness of 5.0 microns coated from a 4.0 percent by weight solution in toluene and dried at 100° C.

Preparation of the Second Coating Which is Hydrophobic Luminescent, Abrasion Resistant, Anti-Slip, Contains Flavor Producing Material:

This first release coating was further coated with a second resistant scuffing coating of a hydrophobic luminescent, abrasion resistant, anti-slip layer containing a flavor producing material, and which coating was obtained from a hydrophobic blend comprised of 65 parts by weight of hydroxypropylmethyl cellulose phthalate, 5 parts by weight of strawberry flavor producing ethyl maltol, 5 parts by weight of strawberry flavor producing methyl cinnamate, 5 parts by weight of strawberry flavor producing 4-hydroxy-2,5-dimethyl-3(2H)-furanone, 5 parts by weight of strawberry flavor producing ethylmethylphenylglycidate, 4 parts by weight of.R-105-817 pink available from Radiant Color Corporation, 5 parts by weight of the antistat polymethyl acrylate trimethyl ammonium chloride latex, 3 parts by weight of UV absorbing compound 2-(4-benzoyl-3-hydroxyphenoxy) ethylacrylate (Cyasorb UV-416, #41,321-6), 2 parts by weight of an antioxidant compound didodecyl-3,3'-thiodipropionate (Cyanox, LTDP, #D12,840-6), 1 part by weight of filler zirconium oxide (SF-EXTRA available from Z-Tech Corporation), which blend was present in a concentration of 5 percent by weight in acetone. Subsequent to air drying at 100° C., the dried MYLAR® rolls contained 0.5 gram, 5 microns in thickness, of the scuff resistant, lightfast, waterfast and fluorescent coating of hydroxypropylmethyl cellulose phthalate containing flavor producing materials.

Preparation of the Adhesive Coating Fourth/Third Combination on the Top of the Above Second Scuff Resistant Coating for Backing Substrates to Imaged Substrates:

The above second scuff resistant coating was further overcoated with two heat and pressure sensitive coatings fourth/third by the solvent extrusion process on a Faustel Coater using a two slot die by coating the second scuff resistant coating containing base sheet simultaneously with third and fourth polymeric layers where the third layer in contact with the scuff resistant coating was comprised of a blend of 90 parts by of acrylic emulsion latex, Rhoplex B-15J from Rohm and Haas Company, 5.0 parts by weight of the antistatic agent Alkasurf SS-0-75, available from Alkaril Chemicals, 3.0 parts by weight of the UV absorbing compound poly[N,N-bis(2,2,6,6-tetramethyl-4-piperidinyl)-1,6-hexanediamine-co-2,4-dichloro-6-morpho lino-1,3,5-triazine] (Cyasorb UV-3346, #41,324-0, available from Aldrich Chemical Company) and 2 parts by weight of an antiozonant compound N-(1,3-dimethylbutyl)-N'-phenyl-phenylene diamine, available as Santoflex 13 from Monsanto Chemicals, which composition was present in a concentration of 35 percent by weight in water and the fourth layer in contact with the third layer contained a polymer with excellent image-wetting properties, that is for example, poly(ethylene oxide) (POLYOX WSRN-3000 obtained from Union Carbide Company) present in a concentration of 2 percent by weight in water. Subsequent to air drying the two layers simultaneously at 100° C. and monitoring the difference in weight prior to and subsequent to coating, the dried MYLAR® rolls containing 5 microns of release coating, and 5 microns of scuff resistant coating, further contained 1.5 gram, 15 microns in thickness, of Rhoplex B-15J containing composition overcoated with poly(ethylene oxide). The MYLAR® coated backing substrates were cut from this roll in sizes of 8.5 by 11.0 inch cut sheets.

Preparation of the Xerographic Image on Opaque Substrate Such as Paper:

Twenty sheets of commercially available Courtland papers were fed into a Xerox 5775™ color copier and images were obtained having optical density values of 1.25 (cyan), 1.10 (magenta), 0.75 (yellow) and 1.40 (black).

Lamination of the above imaged papers with the coated backing substrate containing coatings fourth/third/second/first was then accomplished.

The imaged side of paper was brought in contact with the heat and pressure sensitive material coated side of the coated backing substrate and laminated at 150° C. and a pressure of 100 psi for 2 minutes in a Model 7000 Laminator from Southwest Binding Systems, Ontario, Canada. On cooling at room temperature, about 25° C., and pulling by hand the release substrate, the xerographic image was coated with a scuff resistant coating combination of fourth/third/second layers. The coated image had a curl value of 5 millimeters and a gloss value of 75. These images werre 100 percent waterfast when washed with water for 2 minutes at 50° C., and 100 percent lightfast for a period of 6 months without any change in their optical density.

EXAMPLE II

Preparation of the First Release Coating:

Twenty coated backing substrates were prepared by the solvent extrusion process (single side each time initially) on a Faustel Coater using a one slot die by providing for each MYLAR® (roll form) with a thickness of 75 microns with a first release coating from a blend comprised of 75 parts by weight of dimethylsiloxane-bisphenol A carbonate block copolymer, PSO99, available from Petrarch Systems, and 25 parts by weight of a monomeric release material phenyl 2-(trimethylsilyl)methyl sulfone (Aldrich #30,674-6) in a thickness of 5.0 microns coated from a 4.0 percent by weight solution in toluene and dried at 100° C.

Preparation of the Second Coating, Which is Hydrophobic, Abrasion Resistant, Anti-slip, Contains Flavor Producing Material:

The first release coating was further coated with a second coating, which is hydrophobic, and abrasion resistant and contains a flavor producing material resistant to scuffing, which coating was generated from a hydrophobic blend comprised of 65 parts by weight of aromatic ester carbonate copolymer, APE KLI-9306 available from Dow Chemical Company, 20 parts by weight of rose flavor imparting compound β-damascenone, 4 parts by weight of. R-103-G-118 magenta available from Radiant Color Corporation, 5 parts by weight of the antistat(4-ethoxybenzyl)triphenyl phosphonium bromide (Aldrich 26,648-5), 3 parts by weight of UV absorbing compound poly[N,N-bis(2,2,6,6-tetramethyl-4-piperidinyl)-1,6-hexane diamine-co-2,4-dichloro-6-morpholino-1,3,5-triazine] (Cyasorb UV-3346, #41,324-0, available from Aldrich Chemical Company), 2 parts by weight of an antioxidant compound 2,2'-ethylidene-bis(4,6-di-tert-butylphenyl)fluoro phosphonite, available as Ethanox 398 from Ethyl Corporation, 1 part by weight of filler colloidal silica, Syloid 74 available from Grace Company, which blend was present in a concentration of 5 percent by weight in acetone. Subsequent to air drying at 100° C. and monitoring the difference in weight prior to and subsequent to coating, the dried MYLAR® rolls contained 0.5 gram, 5 microns in thickness, of the scuff resistant, lightfast, waterfast and high gloss coating of aromatic ester carbonate copolymer containing rose flavor imparting compound β-damascenone, fluorescent magenta pigment, (4-ethoxybenzyl) triphenyl phosphonium bromide, poly[N,N-bis(2,2,6,6-tetramethyl-4-piperidinyl)-1,6-hexane diamine-co-2,4-dichloro-6-morpholino-1,3,5-triazine], 2,2'-ethylidene-bis(4,6-di-tert-butylphenyl)fluorophosphonite.

Preparation of the Adhesive Coating Fourth/Third on the Top of the Scuff Resistant Second Coating for Adhering Backing Substrates to Imaged Substrates:

The scuff resistant coating is further overcoated with two heat and pressure sensitive coatings fourth/third by the solvent extrusion process on a Faustel Coater using a two slot die by coating the second scuff resistant coating containing base simultaneously with third and fourth polymeric layers where the third layer in contact with the second scuff resistant coating was comprised of a blend of 90 parts by weight of poly(2-ethylhexyl methacrylate), #229, available from Scientific Polymer Products, 5 parts by weight of the antistat 2-methyl-3-propyl benzothiazolium iodide (Aldrich 36,329-4), 3 parts by weight of UV absorbing compound poly[2-(4-benzoyl-3-hydroxyphenoxy)ethylacrylate] (Cyasorb UV-2126, #41,323-2, available from Aldrich Chemical Company), and 2 parts by weight of an antioxidant and antiozonant compound 6-ethoxy-1,2-dihydro-2,2,4-trimethyl quinoline, available as Santoflex AW from Monsanto Chemicals, present in a concentration of 10 percent by weight in toluene. The fourth layer in contact with the third layer was a polymer having excellent image-wetting properties, epichlorohydrin-ethylene oxide copolymer, #155 available from Scientific Polymer Products, present in a concentration of 2 percent by weight in toluene. Subsequent to air drying the two layers simultaneously at 100° C. and monitoring the difference in weight prior to and subsequent to coating, the dried MYLAR® rolls containing 5 microns of the first release coating, and 5 microns of the second scuff resistant coating, further contained 1.5 gram, 15 microns in thickness, of poly(2-ethylhexyl methacrylate) overcoated with epichlorohydrin-ethyleneoxide copolymer. The coated backing substrates were cut from this roll in 8.5 by 11.0 inch cut sheets.

Preparation of the Ink Jet Ink Images on Paper:

20 Sheets of commercially available Courtland papers were incorporated into a color ink jet printer containing inks of the following compositions:

Cyan: 15.785 parts by weight of sulfolane, 10.0 parts by weight of butyl carbitol, 2.0 parts by weight of ammonium bromide, 2.0 parts by weight of N-cyclohexylpyrollidinone obtained from Aldrich Chemical Company, 0.5 part by weight of tris(hydroxymethyl)aminomethane obtained from Aldrich Chemical Company, 0.35 part by weight of EDTA (ethylenediamine tetra acetic acid) obtained from Aldrich Chemical Company, 0.05 part by weight of DOWICIL 150 biocide, obtained from Dow Chemical Company, Midland, Mich., 0.03 part by weight of polyethylene oxide (molecular weight 18,500 obtained from Union Carbide Company), 35 parts by weight of Projet Cyan 1 dye obtained from ICI, and 34.285 parts by weight of deionized water.

Magenta: 15.785 parts by weight of sulfolane, 10.0 parts by weight of butyl carbitol, 2.0 parts by weight of ammonium bromide, 2.0 parts by weight of N-cyclohexylpyrollidinone obtained from Aldrich Chemical Company, 0.5 part by weight of tris(hydroxymethyl) aminomethane obtained from Aldrich Chemical Company, 0.35 part by weight of EDTA (ethylenediamine tetra acetic acid) obtained from Aldrich Chemical Company, 0.05 part by weight of DOWICIL 150 biocide obtained from Dow Chemical Company, Midland, Mich., 0.03 part by weight of polyethylene oxide (molecular weight 18,500) obtained from Union Carbide Company, 25 parts by weight of Projet magenta 1T dye obtained from ICI, 4.3 parts by weight of Acid Red 52 obtained from Tricon Colors, and 39.985 parts by weight of deionized water.

Yellow: 15.785 parts by weight of sulfolane, 10.0 parts by weight of butyl carbitol, 2.0 parts by weight of ammonium bromide, 2.0 parts by weight of N-cyclohexylpyrollidinone obtained from Aldrich Chemical Company, 0.5 part by weight of tris(hydroxymethyl)aminomethane obtained from Aldrich Chemical Company, 0.35 part by weight of EDTA (ethylenediamine tetra acetic acid) obtained from Aldrich Chemical Company, 0.05 part by weight of DOWICIL 150 biocide, obtained from Dow Chemical Company, Midland, Mich., 0.03 part by weight of polyethylene oxide (molecular weight 18,500) obtained from Union Carbide Company, 27.0 parts by weight of Projet yellow 1G dye obtained from ICI, 20.0 parts by weight of Acid Yellow 17 obtained from Tricon Colors, and 22.285 parts by weight of deionized water.

Images were generated having optical density values of 1.40 (cyan), 1.17 (magenta), 0.80 (yellow) and 1.75 (black).

Lamination of imaged paper with the above prepared backing substrate containing coatings fourth/third/second/first was accomplished as follows:

The imaged side of paper was brought in contact with the heat and pressure sensitive material coated side of the coated backing substrate and laminated at 150° C. and a pressure of 100 psi for 2 minutes in a Model 7000 Laminator from Southwest Binding Systems, Ontario, Canada. On cooling at room temperature and pulling the release substrate, the ink jet image was coated with a scuff resistant coating combination fourth/third/second layers. The coated image had a curl value of 5 millimeters and a gloss value of 80. These images were 100 percent waterfast when washed with water for 2 minutes at 50° C. (Centigrade) and 100 percent lightfast for a period of 6 months without any change in their optical density.

EXAMPLE II

Preparation of the First Release Coating:

Twenty coated backing substrates were prepared by the solvent extrusion process (single side each time initially) on a Faustel Coater using a one slot die, by providing for each MYLAR® (roll form) with a thickness of 75 microns with a first release coating from a blend comprised of 75 parts by weight of dimethyl siloxane-bisphenol A carbonate block copolymer, PSO99 available from Petrarch Systems, and 25 parts by weight of a monomeric release material (9,10-dihydro-9-anthracenyl)trimethyl silane (Aldrich #40,612-0) in a thickness of 5.0 microns coated from a 4.0 percent by weight solution in toluene and dried at 100° C.

Preparation of the Second Coating, Which is Hydrophobic, Abrasion Resistant, Anti-slip, Contains Flavor Producing Material:

The first release coating was further coated with a second coating which was hydrophobic, and abrasion resistant, and which coating or layer was generated from a hydrophobic blend comprised of 65 parts by weight of poly(α-methylstyrene), 20 parts by weight of musk flavor imparting compound such as muscone, 5 parts by weight of the antistatic agent 2-methyl-3-propyl benzothiazolium iodide (Aldrich 36,329-4), 4 parts by weight of R-105-817 pink, available from Radiant Color Corporation; 3 parts by weight of UV absorbing compound poly[2-(4-benzoyl-3-hydroxyphenoxy)ethylacrylate] (Cyasorb UV-2126, #41,323-2, available from Aldrich Chemical Company), 2 parts by weight of an antioxidant tris(2,4-di-tert-butyl-phenyl) phosphite, available as Wytox 240 from Olin Corporation, 1 part by weight of filler titanium dioxide (available as Rutile or Anatase from NL Chem Canada, Inc.), which blend was present in a concentration of 5 percent by weight in acetone. Subsequent to air drying at 100° C. and monitoring the difference in weight prior to and subsequent to coating, the dried MYLAR® rolls contained 0.5 gram, 5 microns in thickness, of the scuff resistant, lightfast, waterfast and fluorescent, musk flavor coating.

Preparation of the Adhesive Coating Fourth/third on the Top of the Scuff Resistant Second Coating for Adhering Backing Substrates to Imaged Substrates:

The scuff resistant second coating was further overcoated with two heat and pressure sensitive coatings fourth/third by the solvent extrusion process on a Faustel Coater using a two slot die by coating the second scuff resistant coating containing base sheet simultaneously with third and fourth polymeric layers where the third layer in contact with the scuff resistant coating was comprised of a blend of 90 parts by weight of poly(2-ethylhexyl methacrylate), #229, available from Scientific Polymer Products, 5 parts by weight of the antistatic agent 2-methyl-3-propyl benzothiazolium iodide (Aldrich 36,329-4), 3 parts by weight of UV absorbing compound poly[2-(4-benzoyl-3-hydroxyphenoxy) ethylacrylate] (Cyasorb UV-2126, #41,323-2, available from Aldrich Chemical Company), and 2 parts by weight of an antioxidant compound 4,4'-methylene-bis(dibutyl dithiocarbamate), available as Vanlube 7723 from Vanderbilt Corporation, present in a concentration of 10 percent by weight in toluene. The fourth coating layer in contact with the third layer was a polymer having excellent image-wetting properties,such as epichlorohydrin-ethylene oxide copolymer #155, available from Scientific Polymer Products, present in a concentration of 2 percent by weight in toluene. Subsequent to air drying the two layers simultaneously at 100° C. and monitoring the difference in weight prior to and subsequent to coating, the dried MYLAR® rolls containing 5 microns of the first release coating, and 5 microns of the second scuff resistant coating, further contained 1.5 gram, 15 microns in thickness, of poly(2-ethylhexyl methacrylate) overcoated with epichlorohydrin-ethyleneoxide copolymer. The coated backing substrates were cut from this roll in 8.5 by 11.0 inch cut sheets.

Preparation of the Xerographic Image on Commercial Transparencies:

Twenty sheets of Fuji Xerox COLOR OHP Transparency were fed into a Fuji Xerox color copier and images were obtained having optical density values of 1.20 (cyan), 1.15 (magenta), 0.77 (yellow) and 1.35 (black).

Lamination of the images on transparency with the coated backing substrate containing coating fourth/third/second/first was then accomplished.

The imaged side of the transparency was brought in contact with the heat and pressure sensitive material coated side of the coated backing substrate and laminated at 150° C. and a pressure of 100 psi for 2 minutes in a Model 7000 Laminator from Southwest Binding Systems, Ontario, Canada. On cooling at room temperature and pulling the release substrate, the xerographic image was coated with a scuff resistant coating combination of fourth/third/second layers. The image/protective coating structures had a curl value of 5 millimeters and a gloss value of 90. These images were 100 percent waterfast when washed with water for 2 minutes at 50° C. and 100 percent lightfast for a period of 6 months without any change in their optical density.

Other embodiments and modifications of the present invention may occur to those skilled in the art subsequent to a review of the information presented herein; these embodiments modifications, and equivalents thereof, are also included within the scope of this invention.

What is claimed is:

1. A coated component comprised of a substrate and thereover a coating or layer of (1) a polymer and monomer release compound, (2) a hydrophobic binder, a luminescence imparting agent, a lightfastness agent, an antistatic agent, a flavor imparting agent, and a filler, (3) a polymeric adhesive binder with a glass transition temperature of from about −50°C. to about 55° C., an antistatic agent, and a lightfastness agent, and (4) a toner wetting layer comprised of a hydrophilic polymer.

2. A component in accordance with claim 1 wherein the substrate contains thereover in sequence layers of (1), (2), (3), and (4), with (1) in contact with the substrate, (2) in contact with (1) and coated thereon, (3) in contact with (2) and coated thereon, and (4) in contact with (3) and coated thereon, and wherein said hydrophilic polymer possesses a melting point of from about 50° C. to about 100° C.

3. A component in accordance with claim 2 wherein said substrate is selected from the group consisting of (1) polyesters, (2) polyethylene naphthalates, (3) polycarbonates, (4) polysulfones, (5) polyether sulfones, (6) poly(arylene sulfones), (7) cellulose triacetate, (8) polyvinylchloride, (9) cellophane, (10) polyvinyl fluoride, (11) polypropylene, (12) polyimides, and (13) cellulosic papers.

4. A component in accordance with claim 2 wherein (1) is comprised of from about 10 parts by weight to about 90 parts by weight of said polymer and from about 90 parts by weight to about 10 parts by weight of said monomer release compound.

5. A component in accordance with claim 4 where the polymer of (1) is present in an amount of from about 30 parts by weight to about 70 parts by weight, and which polymer is selected from the group consisting of (1) polydimethylsilane, (2) polydimethylsiloxane, (3) polydimethylsiloxane, bis(12-hydroxy stearate)-terminated, (4) polydimethylsiloxane, distearate-terminated, (5) polydimethylsiloxane, hydroxy-terminated, (6) polydimethylsiloxane, methoxy-terminated, (7) polydimethylsiloxane, vinyl-terminated, (8) poly (dimethylsiloxane-co-dimeracid), bis(perfluorododecyl)-terminated, (9) poly(methylhydrosiloxane), (10) poly (methylphenylsiloxane), (11) α-methylstyrene-dimethylsiloxane block-copolymers, (12) dimethylsiloxane-bisphenol-A-carbonate, block-copolymers, (13) poly (dimethylsiloxane-co-diphenylsiloxane), (14) polydimethylsiloxane, monocarbinol-terminated, (15) poly (dimethylsiloxane), dicarbinol-terminated, and (16) poly (dimethylsiloxane)-b-poly(propyleneoxide)-b-poly (ethylene oxide) copolymers.

6. The component in accordance with claim 4 where the monomeric release compound is present in an amount of from about 30 parts by weight to about 70 parts by weight, and which compound is selected from the group consisting of (1) tripropylsilane, (2) tributylsilane, (3) tribenzylsilane, (4) triphenylsilane, (5) triphenylvinyl silane, (6) phenyltrimethyl silane, (7) 1-(trimethylsilyl)-H-benzotriazole, (8) phenyl-2-(trimethylsilyl)methyl sulfone, (9) phenyl-2-(trimethyl silyl)ethylsulfone, (10) phenyl 2-(trimethylsilyl) ethynyl sulfone, (11) 4-tolyl-2-(trimethylsilyl)ethynyl sulfone, (12) (trimethylsilyl) acetic acid, (13) 2-(trimethylsilyl)ethoxy methyl triphenyl phosphonium chloride, (14) 1-(trimethylsilyl methyl)urea, (15) (3-trimethylsilyl-2-propynyl)triphenyl phosphonium bromide, (16) octamethyl cyclotetra siloxane, (17) methyl (diphenylmethyl silyl)acetate, (18) dimethyl octadecyl silane, (19) (9,10-dihydro-9-anthracenyl)trimethyl silane, (20) tetrakis(trimethylsilyl)silane, (21) (3-mercapto propyl) trimethoxy silane, (22) 3-glycidoxy propyl trimethoxy silane, (23) 3-amino propyl triethoxy, (24) phenyl trimethoxy silane, (25) bis[(3-trimethoxy silyl)propyl] amine, (26) 1,2-bis(dichloromethyl silyl)ethane, (27) 3-(triethoxy silyl)propyl thiocyanate, (28) 4-(triethoxy silyl) butyronitrile, (29) 3-(triethoxy silyl)propyl] trimethyl ammonium chloride, (30) 3-(triethoxy silyl)propyl isocyanate, (31) 3-(triethoxy silyl)propionitrile, (32) ethyl (S)-(-)-2-(tert-butyl dimethyl silyloxy) propionate, (33) 3-(tert-butyl dimethyl silyloxy)glutaric anhydride, (34) bromo dimethyl trityl, (35) 3-chloropropyl)trimethoxy silane, (36) chloromethyl trimethoxy silane, (37) chloro tris(1,3-dimethyl butoxy)silane, (38) chloro methyl(2-chlorophenoxy)dimethyl silane, (39) 1,7-dichloro octamethyl tetrasiloxane, (40) dichloromethylphenylsilane, (41) benzyl trichlorosilane, (42) phenyl trichlorosilane, (43) tolyltrichloro silane, (44) dodecyl trichloro silane, (45) chlorotripropyl silane, (46) chlorotriisopropyl silane, (47) chlorotributyl silane, (48) chlorotribenzyl silane, (49) chlorodimethyloctadecylsilane, and (50) trichloromethyltrimethyl silane.

7. The component in accordance with claim 4 wherein the thickness of (1) is from about 0.1 micron to about 25 microns.

8. The component in accordance with claim 1 wherein (2) is comprised of a binder present in an amount of from about 97.5 parts by weight to about 20 parts by weight, a luminescence imparting agent present in an amount of from about 0.5 part by weight to about 20 parts by weight, a flavor imparting agent present in an amount of from about 0.5 part by weight to about 10 parts by weight, an antistatic agent present in an amount of from about 0.5 part by weight to about 20 parts by weight, a lightfastness agent present in amount of from about 0.5 part by weight to about 20 parts by weight, and a filler present in an amount of from about 0.5 part by weight to about 10 parts by weight.

9. The component in accordance with claim 8 wherein the binder is a hydrophobic binder polymer present in amounts of from about 97.5 parts by weight to about 20 parts by weight, and which binder is selected from the group consisting of (1) poly(vinylacetate), (2) poly(vinylformal), (3) poly(vinylbutyral), (4) vinylalcohol-vinylbutyral-copolymers, (5) vinylalcohol-vinylacetate-copolymers, (6) vinylchloride-vinylacetate copolymers, (7) vinylchloride-vinylacetate-vinylalcohol-terpolymers, (8) vinylchloride-vinylidenechloride-copolymers, (9) cyanoethylated cellulose, (10) cellulose-acetate-hydrogenphthalate, (11) hydroxypropylmethyl-cellulose-phthalate, (12) hydroxypropylmethylcellulose succinate, (13) cellulose triacetate, (14) cellulose-acetate-butyrate, (15) (acrylamidomethyl) cellulose-acetate-butyrate, (16) cellulose propionate, (17) polystyrene, (18) poly(4-methylstyrene), (19) poly(α-methyl-styrene), (20) poly(tert-butylstyrene), (21) poly (chlorostyrene), (22) poly(bromostyrene), (23) poly (methoxystyrene), (24) poly(2,4,6-tribromostyrene), (25) styrene-butylmethacrylate copolymers, (26) styrene-acrylonitrile copolymers, (27) styrene-allylalcohol copolymers, (28) poly(vinylpyridine), (29) poly (vinylpyridine-co-styrene), (30) poly(4-vinyl pyridine-co-butylmethacrylate), (31) poly(vinyltoluene), (32) poly(2-vinyinaphthalene), (33) poly(methylmethacrylate), (34) poly(ethylmethacrylate), (35) poly(phenyl methacrylate), (36) polyamide-resin, (37) poly(p-phenylene-ether-sulfone), (38) polycarbonate, (39) polyesters, and (40) polyester-co-polycarbonate; wherein the flavor imparting agent is present in amounts of from about 0.5 part by weight to about 20 parts by weight and is selected from the group consisting of (1) isoamylacetate, (2) ethyl-2-methylbutyrate, (3) n-hexanal, (4) damascenone, (5) muscone, (6) ethylenebutyrate, (7) ethylenedodecanedioate, (8) eremophilone, (9) anethole, (10) isobutyl-2-butenedioate, (11) 2,5-dimethyl-4-hydroxy-3(2H)-furanone, (12) carvone, (13) benzaldehyde, (14) tolylaldehyde, (15) benzylacetate, (16) 5-methyl-2-phenyl-2-hexenal, (17) isoamyl butyrate, (18) vanillin, (19) isoamyl phenylacetate, (20) 2-methoxy-5-methylpyrazine, (21) cinnamic aldehyde, (22) furfuryl mercaptan, (23) furfuryl thiopropionate, (24) γ-nona lactone, (25) ethyloenanthate, (26) 2-methyl-2-pentenoic acid, (27) methylanth ranilate, (28) ethyl-3-hydroxybutyrate, (29) nootkatone, (30) methyl(methylthio) pyrazine, (31) benzylacetate, (32) indole, (33) citral, (34) α-terpineol, (35) β-sinensal, (36) ethyl anthranilate, (37) thymol, (38) octylaldehyde, (39) decylaldehyde, (40) 2-methyl-3-ρ-tolylpropionaldehyde, (41) hydroxycitronellal dimethylacetal, (42) 2,6-dimethyl-5-heptenal, (43) 2-phenylpropionaldehyde, (44) 2-methyl-3-(4-isopropylphenyl)propionaldehyde, (45) 3-methyl-1,2-cyclopentanedione, (46) menthol, (47) 3-methylthio-1-hexanol, (48) γ-undecalactone, (49) 6-amyl-α-pyrone, (50) 2,5-dimethylpyrazine, (51) ethyldecane-cis-4-trans-2-dienoate, (52) allyl caproate, (53) methyl β-methyl thio propionate, (54) allyl cyclohexane propionate, (55) 6-methyl-α-ionone, (56) trans-α-ionone, (57) 4-(4-hydroxyphenyl)-2-butanone, (58) ethylmaltol, (59) methylcinnamate, (60) 4-hydroxy-2,5-dimethyl-3(2H)-furanone, (61) ethylmethyl phenylglycidate, (62) ethylvanillin, and (63) propenyl quaethol; wherein the luminescent agent is present in an amount of from about 0.5 part by weight to about 20 parts by weight, and is selected from the group consisting of inorganic phosphors, organic phosphors and polymeric phosphors; wherein the lightfastness agent is present in amounts of from about 0.5 part by weight to about 20 parts by weight and is selected from the group consisting of (1) 2-(4-benzoyl-3-hydroxyphenoxy) ethylacrylate, (2) 1,2-hydroxy-4-(octyloxy) benzophenone, (3) poly[2-(4-benzoyl-3-hydroxy phenoxy)ethylacrylate], (4) hexadecyl-3,5-di-tert-butyl-4-hydroxybenzoate, (5) poly [N,N-bis(2,2,6,6-tetramethyl-4-piperidinyl)-1,6-hexane diamine-co-2,4-dichloro-6-morpholino-1,3,5-triazine], (6) 2-dodecyl-N-(2,2,6,6-tetra methyl-4-piperidinyl) succinimide, (7) 2-dodecyl-N-(1,2,2,6,6-pentamethyl-4-piperidinyl)succinimide, (8) N-(1 -acetyl-2,2,6,6-tetramethyl-4-piperidinyl)-2-dodecyl-succinimide, (9) 1-[N-[poly(3-allyloxy-2-hydroxypropyl)-2-aminoethyl]-2-imidazolidinone], (10) poly(2-ethyl-2-oxazoline), (11) 2,2'-methylenebis(6-tert-butyl-4-methylphenol), (12) 2,2'-methylenebis(6-tert-butyl-4-ethylphenol), (13) tris(4-tert-butyl-3-hydroxy-2,6-dimethylbenzyl) isocyanurate, (14) didodecyl-3,3'-thiodipropionate, (15) ditridecyl-3,3'-thiodipropionate, (16) ditetradecyl-3,3'-thiodipropionate, (17) dioctadecyl-3,3'-thio dipropionate, (18) 1,3,5-trimethyl-2,4,6-tris(3,5-di-tert-butyl-4-hydroxybenzyl) benzene, and (19) 2,6-ditert-butyl-4-(dimethylaminomethyl) phenol; and wherein the antistatic agent is present in amounts of from about 0.5 part by weight to about 20 parts by weight and is selected from the group consisting of (1) monoester sulfosuccinates, (2) diester sulfosuccinates, (3) sulfosuccinamates, (4) ammonium quaternary salts, (5) phosphonium quaternary salts, (6) sulfonium quaternary salts, (7) thiazolium quaternary salt, and (8) benzothiazolium quaternary salts; and wherein the filler is selected from the group consisting of (1) zirconium oxide, (2) colloidal silicas, (3) titanium dioxide, (4) hydrated alumina, (5) barium sulfate, (6) calcium carbonate, (7) high brightness clays, (8) calcium silicate, (9) cellulosics, (10) blend of calcium fluoride and silica, (11) zinc oxide, and (12) blends of zinc sulfide with barium sulfate.

10. The component in accordance with claim 2 wherein the thickness of layer (2) in contact with (1) is from about 0.1 micron to about 25 microns.

11. The component in accordance with claim 2 wherein said layer (3) is comprised of an adhesive polymeric binder with a glass transition temperature of from about −50° C. to about plus +55° C. present in an amount of from about 99 parts by weight to about 60 parts by weight, an antistatic agent present in an amount of from about 0.5 part by weight to about 20 parts by weight, and a lightfastness agent present in an amount of from about 0.5 part by weight to about 20 parts by weight; and wherein said binder is (1) a rubber latex, (2) a polyester latex, (3) a vinyl chloride latex, (4) an ethylene-vinyl chloride copolymer latex, (5) a polyvinyl acetate homopolymer latex, (6) an ethylene-vinyl acetate copolymer latex, (7) an acrylic-vinyl acetate copolymer latex, (8) a vinyl acrylic terpolymer latex, (9) a polystyrene latex, (9) a styrene-butadiene latex, (10) a butadiene-acrylonitrile latex, or (11) a butadiene-acrylonitrile-styrene terpolymer latex.

12. The component in accordance with claim 11 wherein said adhesive polymer is present in an amount of from about 96 parts by weight to about 70 parts by weight and comprises a water soluble binder selected from the group consisting of (1) melamine-formaldehyde resin, (2) urea-formaldehyde resin, (3) alkylated urea-formaldehyde resins, (4) vinyl methyl ether-maleic anhydride copolymer, (5) ethylene-maleic anhydride copolymers, (6) butadiene-maleic acid copolymers, (7) octadecene-1-maleic anhydride copolymer, (8) polyvinylmethylether, (9) vinylmethylether-maleic acid copolymer, and (10) methyl vinyl ether-maleic acid ester; or wherein said polymer binder having a glass transition temperature of between −50° C. to about 55° C. comprises a solvent soluble binder selected from the group consisting of (1) ethylcellulose, (2) poly(2-hydroxyethylmethacrylate), (3) poly(2-hydroxyethylacrylate), (4) poly(hydroxypropyl-acrylate), (5) hydroxyethyl cellulose acrylate, (6) hydroxyethyl cellulose methacrylate, (7) poly(n-propylmethacrylate), (8) poly (n-butylmethacrylate), (9) poly(n-butylmethacrylate-co-isobutylmethacrylate), (10) poly(tert-butylaminoethyl methacrylate), (11) poly(n-hexylmethacrylate), (12) poly(2-ethylhexyl methacrylate), (13) poly(n-decyl methacrylate), (14) poly(isodecyl methacrylate), (15) polyethylene, (16) polypropylene, (17) poly(1-butene), (18) ethylene-propylene copolymer, (19) ethylene-ethylacrylate copolymer, (20) ethylene-propylene-diene terpolymer, (21) polychloroprene, (22) polyvinylisobutylether, (23) octadecene-1-maleic anhydride copolymer, (24) poly(vinyl stearate), (25) poly(vinyl propionate), (26) poly(vinyl pivalate), (27) poly(vinyl neodecanoate), (28) poly(vinyl acetate), (29) poly(ethylene adipate), (30) poly(ethylene succinate), (31) poly(ethylene azelate), (32) poly(1,4-butylene adipate), (33) poly(trimethylene adipate), (34) poly (trimethylene glutarate), (35) poly(trimethylene succinate), (36) poly(hexamethylene succinate), (37) poly(diallyl phthalate), and (38) poly(diallyl isophthalate).

13. A component in accordance with claim 2 wherein said lightfastness agent of (2), and said lightfastness agent of (3) are each present in amounts of from about 0.5 part by weight to about 20 parts by weight, are selected from the group consisting of (1) 2-(4-benzoyl-3-hydroxy phenoxy) ethylacrylate), (2) 1,2-hydroxy-4-(octyloxy)benzophenone, (3) poly[2-(4-benzoyl-3-hydroxyphenoxy)ethylacrylate], (4) hexadecyl-3,5-di-tert-butyl-4-hydroxybenzoate, (5) poly [N,N-bis(2,2,6,6-tetramethyl-4-piperidinyl)-1,6-hexanediamine-co-2,4-dichloro-6-morpholino-1,3,5-triazine], (6) 2-dodecyl-N-(2,2,6,6-tetramethyl-4-piperidinyl)succinimide, (7) 2-dodecyl-N-(1,2,2,6,6-pentamethyl-4-piperidinyl)succinimide, (8) N-(1-acetyl-2,2,6,6-tetramethyl-4-piperidinyl)-2-dodecylsuccinimide, (9) 1-[N-[poly(3-allyloxy-2-hydroxypropyl)-2-aminoethyl]-2-imidazolidinone], (10) 2,2'-ethylidene-bis(4,6-di-tert-butylphenyl)fluorophosphonite, (11) 2,2'-methylenebis(6-tert-butyl-4-methylphenol), (12) 2,2'-methylene-bis(6-tert-butyl-4-ethylphenol), (13) tris(4-tert-butyl-3-hydroxy-2,6-dimethylbenzyl)isocyanurate, (14) didodecyl-3,3'-thio dipropionate, (15) ditridecyl-3,3'-thiodipropionate, (16) ditetradecyl-3,3'-thiodipropionate, (17) dioctadecyl-3,3'-thiodipropionate, (18) 1,3,5-trimethyl-2,4,6-tris(3,5-di-tert-butyl-4-hydroxybenzyl)benzene, (19) 2,6-ditert-butyl-4-dimethyl amino methylphenol, (20) N-isopropyl-N'-phenyl-phenylene diamine, (21) N-(1,3-dimethyl butyl)-N'-phenyl-phenylenediamine, (22) N,N'-di(2-octyl)-4-phenylene diamine, (23) N,N'-bis(1,4-dimethyl pentyl)-4-phenylene diamine; and mixtures thereof.

14. The component in accordance with claim 2 wherein said antistatic agent of (2) and of (3) is present in amounts of from about 0.5 part by weight to about 20 parts by weight and is selected from the group consisting of (1) monoester sulfosuccinates, (2) diester sulfosuccinates, (3) sulfosuccinamates, (4) ammonium quaternary salts, (5) phosphonium quaternary salts, (6) sulfonium quaternary salts, (7) thiazolium quaternary salt, and (8) benzothiazolium quaternary salts.

15. The component in accordance with claim 2 wherein the thickness of layer (3) which functions primarily as an adhesive layer is from about 0.1 micron to about 25 microns.

16. The component in accordance with claim 2 wherein the hydrophilic polymer in the toner wetting layer/coating (4) is a polyoxyalkylene containing polymer.

17. The component in accordance with claim 16 wherein said hydrophilic-polyoxyalkylene containing polymer is selected from the group consisting of (1) poly(ethylene oxide), (2) ethylene oxide/propylene oxide copolymers, (3) ethylene oxide/2-hydroxyethylmethacrylate/ethyleneoxide, (4) ethylene oxide/hydroxypropyl methacrylate/ethylene oxide triblock copolymers, (5) ionene/ethylene oxide/ionene triblock copolymers, (6) ethyleneoxide/isoprene/ethyleneoxide triblock copolymers, and (7) epichlorohydrin-ethylene oxide copolymer, and wherein the thickness of the toner wetting layer (4) in contact with the layer (3) is from about 0.1 micron to about 25 microns.

18. A method for generating gloss on an image, said method comprising (A) providing a substrate with a toner image formed thereon, which image is formed by a non-photographic imaging process; (B) providing a backing substrate having one surface thereof coated with four coatings in a layered structure containing (1) a first coating in contact with the substrate comprised of a release composition comprised of a release polymer and a monomeric release compound, (2) a second coating thereover on the release coating, and which coating is a scuff resistant, luminescent, lightfast, and a waterfast transparent polymeric coating comprised of a hydrophobic binder, a luminescence imparting agent, a lightfastness agent, an antistatic agent, a flavor imparting compound, and a filler, (3) a third adhesive coating thereover on the second coating comprised of a polymeric adhesive binder with a glass transition temperature of from about −50° C. to about 55° C., an antistatic agent and a lightfastness agent, and (4) a fourth toner wetting coating thereover on the third adhesive coating comprised of a hydrophilic polymer with a melting point of from about 50° C. to about 100° C.; (C) laminating the imaged substrate to the backing substrate with heat and pressure, and transferring the scuff resistant coating from the release substrate on to the image to thereby generate glossy images.

19. A method in accordance with claim 18 which comprises (A) providing a paper containing a xerographically formed image thereon, (B) providing a backing polyester substrate having one surface thereof coated with four coatings in a layered structure containing (1) a first coating in contact with the polyester substrate comprised of a release composition comprised of 75 percent by weight of the release polymer α-methylstyrene-dimethylsiloxane block copolymers, dimethylsiloxane-bisphenol-A-carbonate block copolymers, and a monomeric release compound of 1,7-dichloro octamethyl tetra siloxane, phenyl-2-(trimethylsilyl) methylsulfone, or (9,10-dihydro-9-anthracenyl)trimethyl silane; (2) a second coating which is about 100 percent lightfast, and about a 100 percent waterfast transparent polymeric coating comprised of (a) 65 percent by weight of the hydrophobic polycarbonate, polyester, aromatic ester carbonate copolymer binders, (b) 4 percent by weight of the luminescence producing radiant compounds radiant pink pigment, or radiant magenta pigment, (c) 20 percent by weight of the flavor imparting compound ethyl maltol, methyl cinnamate, 4-hydroxy-2,5-dimethyl-3(2H)-furanone, ethylmethylphenylglycidate, damascenone, or muscone, (d) 5 percent by weight of the antistatic agent polymethyl acrylate trimethyl ammonium chloride latex, or 2-methyl-3-propyl benzothiazolium iodide, (e) 2 percent by weight of the lightfastness UV absorbing compound 2-hydroxy-4-(octyloxy)benzophenone, or 2-(4-benzoyl-3-hydroxy phenoxy)ethyl acrylate, 2 percent by weight of the lightfastness antioxidant compound didodecyl-3,3'-thiodipropionate, ditridecyl- 3,3'-thiodipropionate, ditetradecyl-3,3'-thiodipropionate, or 2,2'-ethylidene-bis(4,6-di-tert-butylphenyl) fluorophosphonite, 1 percent by weight of the lightfastness antiozonant compounds N-isopropyl-N'-phenyl-phenylene diamine, N-(1,3-dimethylbutyl)-N'-phenyl-phenylenediamine, N,N'-di(2-octyl)-4-phenylene diamine, or N,N'-bis(1,4-dimethyl pentyl)-4-phenylene diamine, and (f) a filler of zirconium oxide, or colloidal silicas; (3) a third adhesive coating comprised of (a) about 90 percent by weight of polymeric adhesive acrylic emulsion latex, poly(2-ethylhexyl methacrylate) binder having a glass transition temperature of between −40° C. to about 40° C., (b) 5 percent by weight of the antistatic agent cationic 2-methyl-3-propyl benzothiazolium iodide, or anionic sodium dioctyl sulfosuccinate, and (c) 2 percent by weight of the lightfastness UV absorbing compound poly[2-(4-benzoyl-3-hydroxyphenoxy) ethylacrylate], or poly[N,N-bis(2,2,6,6-tetramethyl-4-piperidinyl)-1,6-hexanediamine-co-2,4-dichloro-6-morpholino-1,3,5-triazine], 2 percent by weight of the lightfastness antioxidant compound didodecyl-3,3'-thiodipropionate, ditridecyl-3,3'-thiodipropionate, or ditetradecyl-3,3'-thiodipropionate, 1 percent by weight of the lightfastness antiozonant compound 6-ethoxy-1,2-dihydro-2,2,4-trimethyl quinoline, or N-(1,3-dimethylbutyl)-N'-phenyl-phenylene diamine; (4) a fourth toner wetting coating comprising 100 percent of the hydrophilic poly(ethylene oxide)epichlorohydrin-ethylene oxide copolymer ethylene oxide/propylene oxide copolymers, or ethylene oxide/propylene oxide/ethylene oxide triblock copolymer with a melting point of about 50° C. to about 100° C.; (C) laminating the imaged substrate to the backing substrate with heat at about 120° C. to about 180° C. and a pressure of from about 25 to about 200 psi, and transferring the scuff resistant coating from the release substrate on to the image to thereby generate glossy images.

20. The method of generating gloss on an image in accordance with claim 18 comprised of (A) providing a paper containing a xerographically formed image; (B) providing a backing polyester substrate having one surface thereof coated with four coatings in a layered structure containing (1) a first coating in contact with the polyester substrate comprised of 75 percent by weight α-methylstyrene-dimethylsiloxane block copolymer, and 25 percent by weight of 1,7-dichloro octamethyl tetra siloxane; (2) a second coating on the top of the release coating comprised of (a) 65 percent by weight of a hydrophobic aromatic ester carbonate copolymer binder, (b) 4 percent by weight of radiant pink, (c) 20 percent by weight of the flavor imparting compound β-damascenone, (d) 5 percent by weight of the antistatic agent polymethyl acrylate trimethyl ammonium chloride latex, (e) 2 percent by weight of the lightfastness UV absorbing compound 2-hydroxy-4-(octyloxy)benzophenone, or 2 percent by weight of the antioxidant compound 2,2'-ethylidene-bis(4,6-di-tert-butylphenyl)fluoro phosphonite, 1 percent by weight of the antiozonant compound N-isopropyl-N'-phenyl-phenylene diamine, and (f) 1 percent by weight of the filler zirconium oxide; (3) a third adhesive coating on the top of the second coating comprising (a) 90 percent by weight of the poly(2-ethylhexyl methacrylate) binder, (b) 5 percent by weight of the antistatic agent anionic sodium dioctyl sulfosuccinate, (c) 3 percent by weight of the lightfastness UV absorbing compound poly[N, N-bis(2,2,6,6-tetramethyl-4-piperidinyl)-1,6-hexanediamine-co-2,4-dichloro-6-morpholino-1,3,5-triazine], 2 percent by weight of the lightfastness antioxidant compounds didodecyl-3,3'-thiodipropionate; (4) a fourth toner wetting coating on the top of the third adhesive coating comprising 100 parts by weight of the hydrophilic epichlorohydrin-ethylene oxide copolymer with a melting point of about 50° C. to about 100° C.; (C) laminating the imaged substrate to the backing substrate with heat at 150° C. and a pressure of 100 psi, and transferring the scuff resistant coating from the release substrate on to the image to thereby generate glossy images.

* * * * *